United States Patent
Yamada et al.

(10) Patent No.: US 8,610,983 B2
(45) Date of Patent: Dec. 17, 2013

(54) ACTUATOR AND OPTICAL SCANNING DEVICE USING ACTUATOR

(75) Inventors: Tsukasa Yamada, Tokyo (JP); Masato Ehara, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 155 days.

(21) Appl. No.: 13/319,380

(22) PCT Filed: Apr. 21, 2010

(86) PCT No.: PCT/JP2010/057096
§ 371 (c)(1), (2), (4) Date: Nov. 8, 2011

(87) PCT Pub. No.: WO2010/131557
PCT Pub. Date: Nov. 18, 2010

(65) Prior Publication Data
US 2012/0062970 A1    Mar. 15, 2012

(30) Foreign Application Priority Data

May 11, 2009 (JP) .................................. 2009-114317
Sep. 4, 2009 (JP) .................................. 2009-205316

(51) Int. Cl.
   *G02B 26/08* (2006.01)
(52) U.S. Cl.
   USPC .................................... 359/199.4; 359/224.1
(58) Field of Classification Search
   USPC .................... 359/223.1–226.1, 871, 872, 234
   See application file for complete search history.

(56) References Cited

U.S. PATENT DOCUMENTS

| | | | |
|---|---|---|---|
| 7,442,918 B2* | 10/2008 | Sprague et al. | 359/226.1 |
| 2005/0219674 A1 | 10/2005 | Asai et al. | |
| 2007/0268544 A1 | 11/2007 | Ueyama | |

FOREIGN PATENT DOCUMENTS

| | | |
|---|---|---|
| JP | 2004-191953 | 7/2004 |
| JP | 2007-310196 | 11/2007 |
| WO | WO 2009/028152 | 3/2009 |

OTHER PUBLICATIONS

International Search Report mailed on Jul. 27, 2010.

* cited by examiner

*Primary Examiner* — Euncha Cherry
(74) *Attorney, Agent, or Firm* — IPUSA, PLLC

(57) ABSTRACT

An actuator which tilts and drives an object to be driven around an axis of rotation includes: a pair of supporting beams arranged to support the object to be driven from both sides thereof in a direction parallel to the axis of rotation; a pair of movable beams arranged to sandwich the object to be driven and the pair of supporting beams from both sides in a direction perpendicular to the axis of rotation; a drive source arranged to apply bending vibration to the movable frames; and a pair of connection parts arranged to connect the movable frames and end portions of the supporting beams by a multiple-beam structure, convert the bending vibration into torsional vibration, and transmit the torsional vibration to the supporting beams.

13 Claims, 26 Drawing Sheets

TILT ANGLE

|  |  | A | B | C |
|---|---|---|---|---|
| TILT ANGLE SENSITIVITY | deg/V | 0.535 | 0.131 | 0.975 |
| MAX INTERNAL STRESS | GPa | 0.39 | 0.59 | 0.40 |

| | | A | B | C |
|---|---|---|---|---|
| TILT ANGLE SENSITIVITY | deg/V | 0.559 | 1.193 | 0.275 |
| MAX INTERNAL STRESS | GPa | 0.48 | 0.48 | 0.52 |

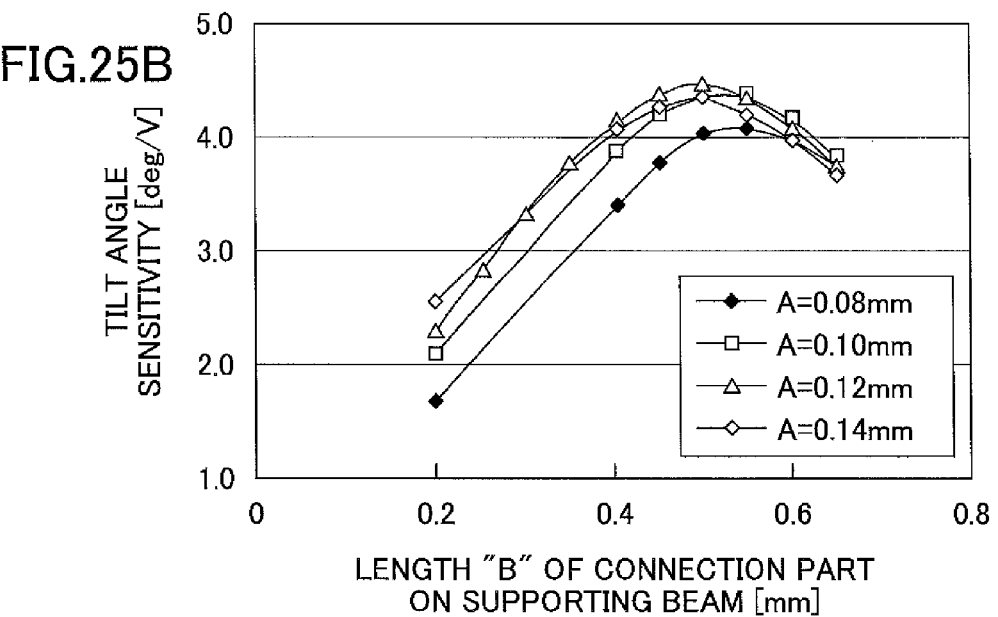
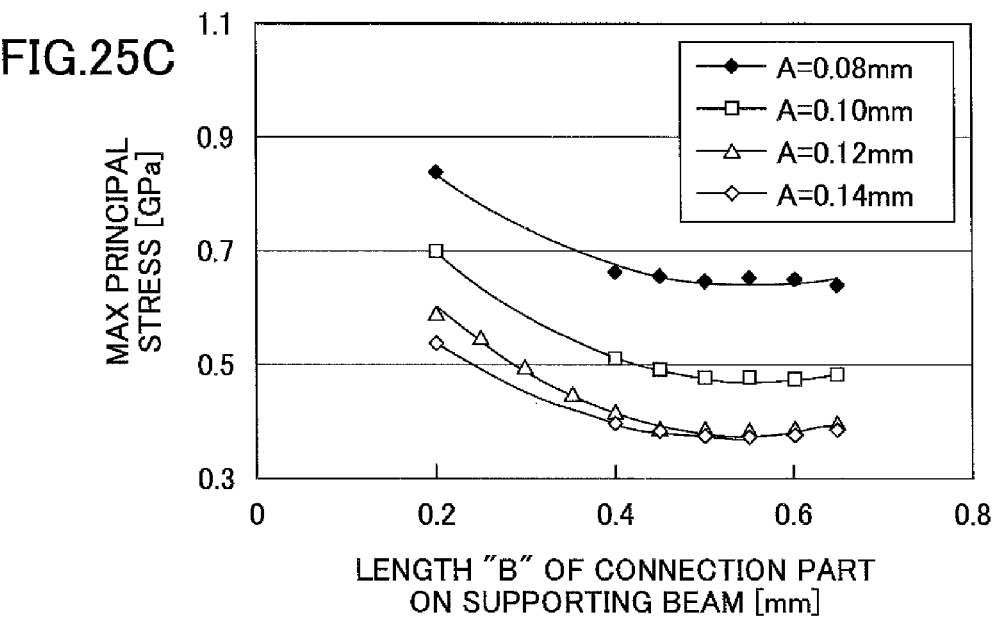

A=0.3mm
B=0.1mm

A=0.3mm
B=0.3mm

A=0.3mm
B=0.2mm

ACTUATOR AND OPTICAL SCANNING DEVICE USING ACTUATOR

TECHNICAL FIELD

The present disclosure generally relates to an actuator and an optical scanning device using an actuator, and more particularly to an actuator which tilts and drives an object to be driven around an axis of rotation, and an optical scanning device using the actuator.

BACKGROUND ART

Conventionally, there is known an optical scanning device in which at least a part of a vibration body having a reflector mirror part formed on a silicon substrate is vibrated and a direction of a light beam incident to the reflector mirror part is changed to a reflection direction so that the reflected light beam is scanned. In the optical scanning device, the vibration body includes a first spring part connected to the reflector mirror part to generate torsional vibration, and a plurality of second spring parts each connected to the first spring part to generate both bending vibration and torsional vibration. All the other ends of the second spring parts are connected and fixed to a fixed frame part, and the optical scanning device includes a plurality of drive sources to vibrate the respective second spring parts. See Patent Document 1 listed below.

In the optical scanning device disclosed in Patent Document 1, each of the second spring parts has an elastic modulus which is the same as that of the first spring part, and has a cross-sectional shape which causes the second sprint part to elastically deform more easily than the first spring part. The displacement of the drive source generates bending vibration in a thickness direction of a plate member which constitutes the second spring part, and the bending vibration is transmitted to the first spring part as a torsional vibration from the portion of the second spring part connected to the first spring part. The load needed for vibrating the reflector mirror part is distributed to the first spring part and the second spring parts.

RELATED ART DOCUMENTS

Patent Documents

Patent Document 1: Japanese Laid-Open Patent Publication No. 2004-191953

DISCLOSURE OF THE INVENTION

Problem to be Solved by the Invention

However, in the optical scanning device disclosed in Patent Document 1, the second spring parts are connected and fixed to the fixed frame part. When the reflector mirror part is inclined, there is a problem that all the torsional and bending stresses are concentrated on the first spring part and the second spring parts.

For example, it is assumed that, in a case of a small-size actuator, the reflector mirror part is inclined by ±12 degrees at frequencies of 30 kHz. It may be estimated that the internal stresses generated in the first spring part and the second spring parts in this case are in a range of 1.3-1.5 GPa.

On the other hand, the dynamic fracture stress of silicon in the torsional vibration mode is on the order of 2 GPa. If the influence of a damaged layer and the application of repeated stress by deep reactive ion etching (D-RIE) are taken into consideration, a substantial fracture stress of silicon in commercial production is on the order of 1.5 GPa. Therefore, there has been a problem in the composition disclosed in Patent Document 1 that a possibility of fracture of silicon by a continuous operation due to the influences of processing conditions, configurations and their fluctuations is high.

The countermeasure for avoiding the fracture problem in the composition disclosed in Patent Document 1 is to reduce the amount of torsion per unit length by extending the first spring part and the second spring parts in the direction of the axis of rotation. In the case of the composition of Patent Document 1, however, the first spring part which is subjected to stress concentration must be prepared to have a sufficient length and thickness, and there has been a problem that miniaturization of the actuator is difficult.

In one aspect, the present disclosure provides an actuator and an optical scanning device using the actuator which are adapted to meet the demand of miniaturization and prevent the stress concentration at a time of tilting drive operation in order to provide stable operation.

Means to Solve the Problem

In an embodiment which solves or reduces one or more of the above-described problems, the present disclosure provides an actuator which tilts and drives an object to be driven around an axis of rotation, the actuator including: a pair of supporting beams arranged to support the object to be driven from both sides thereof in a direction parallel to the axis of rotation; a pair of movable frames arranged to sandwich the object to be driven and the pair of supporting beams from both sides in a direction perpendicular to the axis of rotation; a drive source arranged to apply bending vibration to the movable frames; and a pair of connection parts arranged to connect the movable frames and end portions of the supporting beams by a multiple beam structure, convert the bending vibration into torsional vibration, and transmit the torsional vibration to the supporting beams.

In an embodiment which solves or reduces one or more of the above-described problems, the present disclosure provides an actuator which tilts and drives an object to be driven around an axis of rotation, the actuator including: a pair of supporting beams arranged to support the object to be driven from both sides thereof in a direction parallel to the axis of rotation; a pair of connection parts each including a supporting beam side connection part connected to one of the supporting beams and extending in a direction perpendicular to the axis of rotation, and a drive beam side connection part connected to the supporting beam side connection part and extending toward the side of the object to be driven in a direction parallel to the axis of rotation; and a pair of drive beams connected to the drive beam side connection parts and arranged to sandwich the object to be driven from both sides thereof in the direction perpendicular to the axis of rotation, the pair of drive beams on both the sides of the object to be driven in the direction parallel to the axis of rotation being curved up and down to apply a tilting force to the drive beam side connection parts.

Effect of the Invention

According to the present disclosure, it is possible to provide an actuator which is capable of appropriately distributing the internal stresses during the drive operation, without causing stress concentration on particular parts of the actuator, and capable of driving the object to be driven in a stable manner.

BRIEF DESCRIPTION OF THE DRAWINGS

FIG. 25B is a diagram for explaining the parameter setting of the actuator of Embodiment 3.

FIG. 25C is a diagram for explaining the parameter setting of the actuator of Embodiment 3.

BEST MODE FOR CARRYING OUT THE INVENTION

A description will be given of embodiments of the present disclosure with reference to the accompanying drawings.

Embodiment 1

Figure 1:
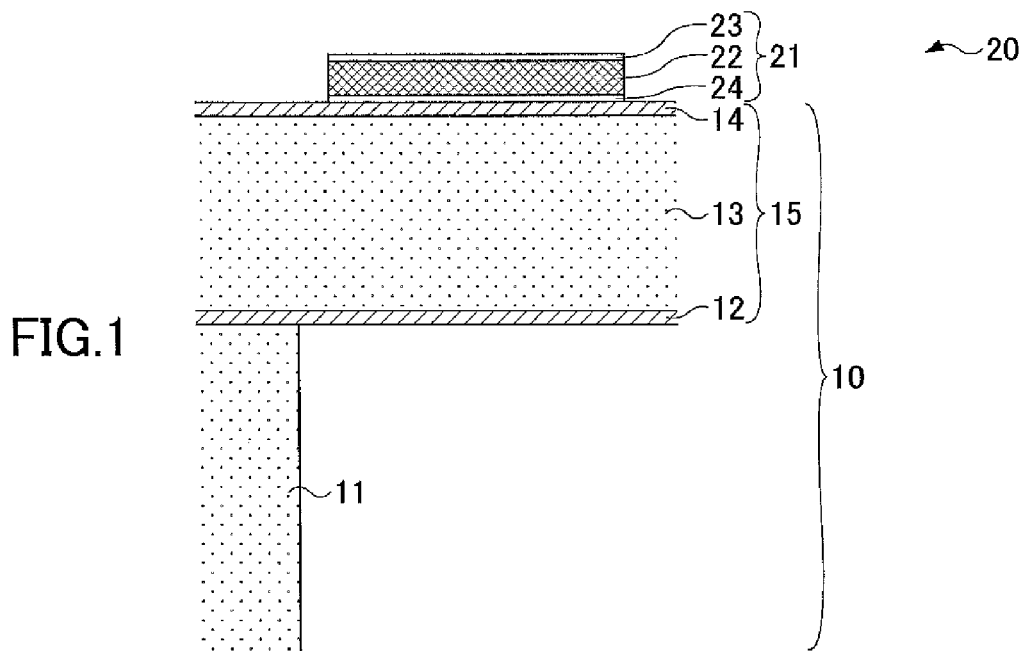
FIG. 1 is a diagram showing the cross-sectional composition of an actuator of Embodiment 1 of the present disclosure.

FIG. 1 is a diagram showing the cross-sectional composition of an actuator of Embodiment 1 of the present disclosure. As illustrated in FIG. 1, the actuator of Embodiment 1 includes a semiconductor wafer 10 and a drive source 20. The actuator of Embodiment 1 may be produced by the fabrication processing of the semiconductor wafer 10 using the MEMS (Micro Electro Mechanical Systems) technology, for example. In FIG. 1, the example at the time of constituting an actuator using such a semiconductor wafer 10 is illustrated.

The semiconductor wafer 10 includes a silicon substrate 11, a $SiO_2$ layer 12, a $SiO_2$ layer 14, and a Si activation layer 14. For example, a silicon-on-insulator (SOI) substrate may be used as the semiconductor wafer 10. The SOI substrate is a substrate in which the $SiO_2$ layer 12 as the insulating layer is formed within the silicon substrate 11. The $SiO_2$ layer is formed on the bottom of the silicon substrate at the etching end point when the silicon substrate 11 is removed by deep reactive ion etching etc., and the deep etching processing can be performed easily.

A beam 15 is constituted by the $SiO_2$ layer 12, the Si activation layer 13, and the $SIO_2$ layer 14. The beam 15 is used to perform a drive operation which supports an object to be driven and transmits a driving force to the object to be driven. The silicon substrate 11 is used as an outer fixed frame, for example.

A total thickness of the semiconductor wafer 10 may be on the order of 300-500 μm. For example, when the semiconductor wafer 10 has a thickness of 350 μm, the beam 15 may have a total thickness of 31 μm, including 30 μm for the Si activation layer 13 and 0.5 μm for each of the $SiO_2$ layer 12 and the $SiO_2$ layer 14, which is equal to about 1/10 thickness of the semiconductor wafer 10.

The drive source 20 is a source of power to generate a driving force in the actuator of this embodiment. In the actuator of this embodiment, various devices may be used as the drive source 20. In the following Embodiment 1, an example of the actuator in which a piezoelectric device 21 is provided as the drive source 20 is illustrated. The piezoelectric device 21 is a passive element which converts the voltage supplied to a piezoelectric crystal 22 into the force. When the piezoelectric device 21 in the actuator of this embodiment receives the voltage supplied, the length of the piezoelectric device 21 expands or contracts, thereby driving the beam 15 to which the piezoelectric device 21 is attached. Various piezoelectric crystals may be used as the piezoelectric crystal 22. For example, a PZT (titanic acid lead zirconate) thin film may be used as the piezoelectric crystal 22. The piezoelectric device 21 may be formed to have a thickness on the order of 2 μm, for example, when the beam 15 has a thickness on the order of 30 μm.

The piezoelectric device 21 includes an upper electrode 23 and a lower electrode 24. The upper electrode 23 and the lower electrode 24 are electrodes for supplying the voltage to the piezoelectric crystal 22, and the piezoelectric crystal 22 expands or contracts when the voltage is supplied to the upper electrode 23 and the lower electrode 24, so that the beam 15 is caused to drive the object to be driven.

Figure 2A:
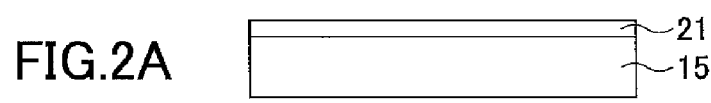
FIG. 2A is a diagram for explaining a method of driving an object in the actuator of Embodiment 1.
Figure 2B:
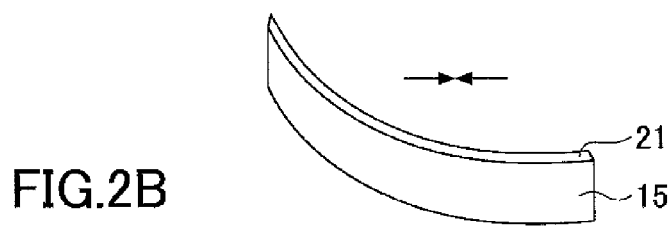
FIG. 2B is a diagram for explaining a method of driving an object in the actuator of Embodiment 1.
Figure 2C:
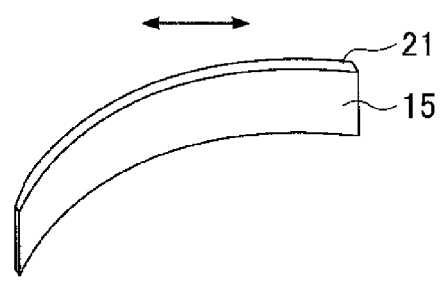
FIG. 2C is a diagram for explaining a method of driving an object in the actuator of Embodiment 1.

FIGS. 2A-2C are diagrams for explaining a method of driving by the actuator of Embodiment 1 in which the piezoelectric device 21 causes the beam 15 to generate bending vibration. FIG. 2A is a side view showing the beam structure 15 of silicon and the piezoelectric device 21. As shown in FIG. 2A, the piezoelectric device 21 is formed as a thin film on the beam 15 which includes the Si activation layer 13.

FIG. 2B is a diagram showing the state in which the piezoelectric device 21 contracts by elastic deformation. When the piezoelectric device 21 contracts as shown in FIG. 2B, the beam structure 15 has an upwardly curved configuration that is convex in the downward direction.

FIG. 2C is a diagram showing the state in which the piezoelectric device 21 expands by elastic deformation. When the piezoelectric device 21 expands as shown in FIG. 2C, the beam structure 15 has a downwardly curved configuration that is convex in the upward direction.

As shown in FIG. 2B and FIG. 2C, depending on the polarization direction or the polarity of the voltage supplied, the piezoelectric device 21 is curved upward or downward. For example, by using the characteristics of the piezoelectric device 21, an object may be driven by the piezoelectric device 21 as the drive source 20 in the actuator of this embodiment.

Figure 3:
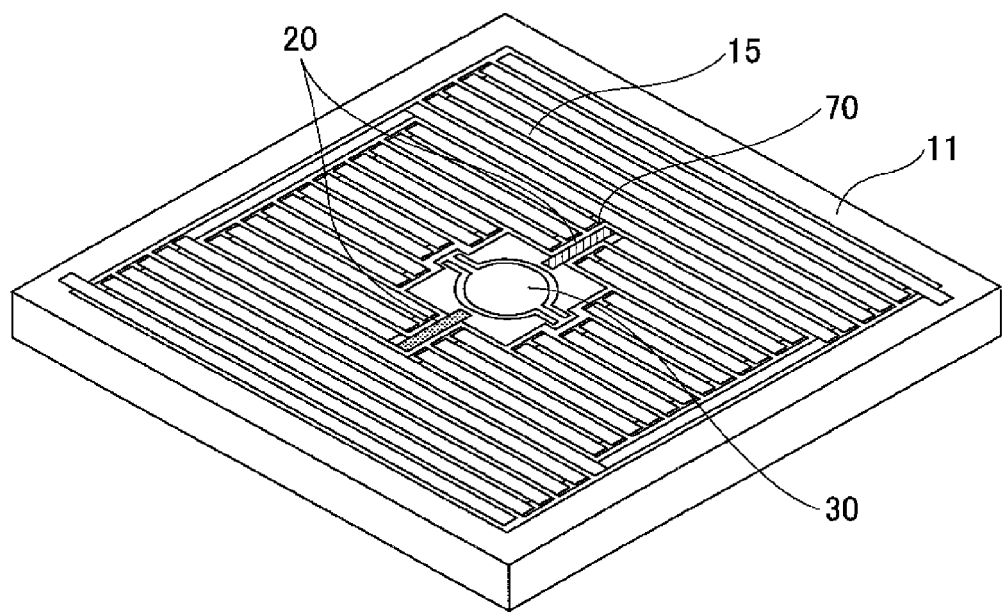
FIG. 3 is a perspective view of a front surface of the actuator of Embodiment 1.

FIG. 3 is a perspective view of a front surface of the actuator of Embodiment 1. As shown in FIG. 3, an outer fixed frame of the actuator of this embodiment is formed by the silicon substrate 11, and the portion inside the silicon substrate 11 is formed by a thin-film portion which has a thickness that is the same as a thickness of the beam 15. The object 30 to be driven is arranged in the center of the actuator. A pair of drive sources 20, each of which is constituted by the piezoelectric device 21, is formed on the beam 15 to sandwich the object 30 from both sides thereof, so that a pair of drive beams 70 is formed. The pair of drive sources 20, provided on the beam 15 to support the object 30 from both the sides thereof, forms the pair of drive beams 70, and the object 30 is driven by the pair of drive beams 70.

The alternating voltage and the opposite alternating voltage are supplied to the piezoelectric devices 21 in the pair of drive beams 70 on the both sides of the object 30 respectively. By supplying such alternating voltage to the piezoelectric devices 21, the displacements of the piezoelectric devices 21 in the different directions as shown in FIG. 2B and FIG. 2C take place, vibration occurs, and the object 30 is driven.

The vibration generated by the piezoelectric device 21 which is the drive source 20 may be resonant vibration. By using the resonant vibration, the drive beam 70 is able to generate large bending vibration, and the object 30 can be driven greatly at a high speed.

Figure 4:
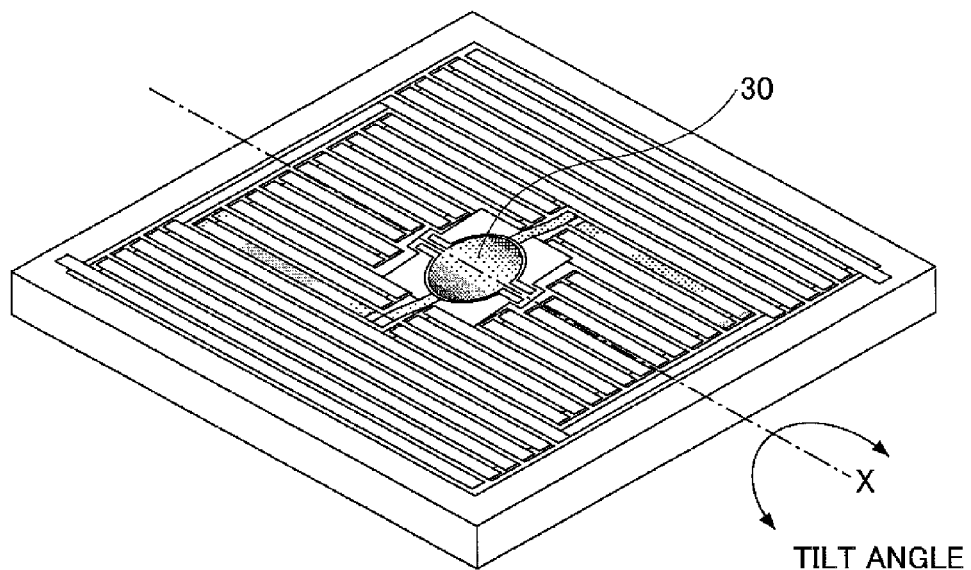
FIG. 4 is a perspective view showing the driving state of the actuator of Embodiment 1.

FIG. 4 is a perspective view showing the state in which the actuator of Embodiment 1 is driven. As shown in FIG. 4, the object 30 is tilted around the axis of rotation X and vibrated through vibration which is generated by the drive beam 70. In FIG. 4, the object 30 is tilted and vibrated such that the left-hand side of the object 30 is lowered and the right-hand side of the object 30 is lifted. In this manner, the actuator of this embodiment is able to tilt and drives the object 30 around the axis of rotation.

Various objects of different types may be used the object 30 to be driven. For example, a mirror for use in a micro projector, a micro scanner, etc. may be used as the object 30. Typically, in a micro projector, a laser light beam is irradiated to a mirror and the light beam reflected from the mirror is scanned to draw an image. In a case in which the screen resolution of XGA (1024×768 pixels) is demanded, the horizontal scanning must be made at a high speed on the order of 30 kHz in the angle range of ±12 deg. and the vertical scanning must be made at a low speed on the order of 60 Hz in the angle range of ±18 deg. In the example of FIG. 4, the high-speed tilting drive at frequencies on the order of 30 kHz is performed around the axis of rotation X. As described above, in the tilting drive state of the object 30 around the axis of rotation X, the resonant vibration may be used, and the high-speed tilting drive can be performed.

Figure 5:
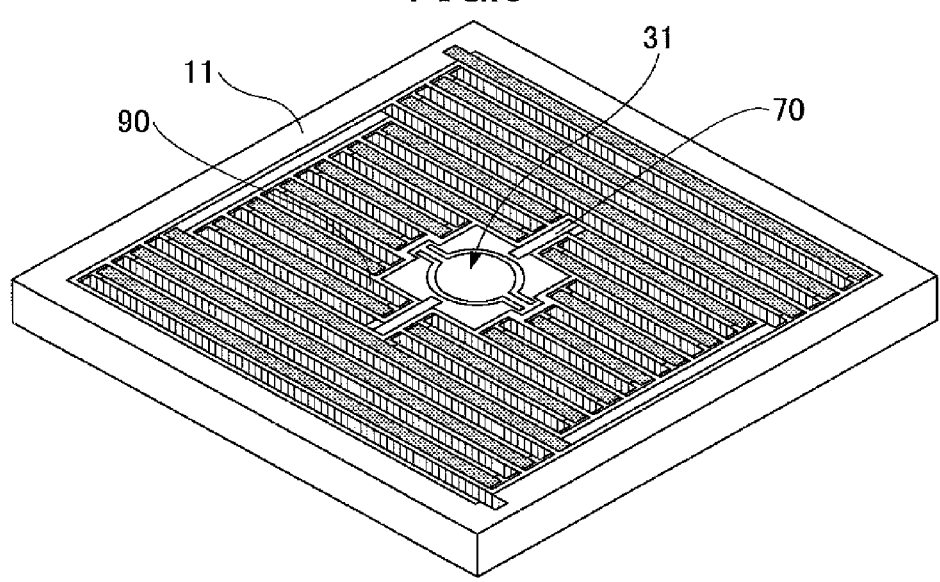
FIG. 5 is a perspective view showing a drive source which performs a tilting drive of an object around two axes of rotation in the actuator of Embodiment 1.

FIG. 5 is a perspective view showing a drive source which performs a tilting drive of an object around two axes of rotation in the actuator of Embodiment 1. Since the actuator which performs the two-axis tilting drive is used in a micro projector or micro scanner in many cases, an example in which a mirror 31 is used as the object 30 will be described.

As shown in FIG. 5, a non-resonant drive source 90 which is a drive source for performing a low speed driving on the order of 60 Hz is additionally provided in the circumference of the mirror 31. In the non-resonant drive source 90, beams 15 are provided to extend in the directions perpendicular to the extending direction of the drive beam 70, and the piezoelectric device 21 which is the drive source 20 is formed on the surface of each beam 15. The non-resonant drive source 90 performs the tilting drive of the mirror 31 around the axis of rotation which is perpendicular to the axis of rotation X shown in FIG. 4. The ends of the adjacent beams are connected so that the beam ends are arrayed alternately, and the non-resonant drive source 90 has a beam arrangement in a zigzag formation.

With the above composition, the alternating positive/negative voltage is supplied to the drive sources 20 of the adjacent beams, and the operation in which the inclination in the extending direction of each beam is accumulated is performed, so that the tilting drive of the mirror 31 is performed in the extending direction of each beam 15 of the non-resonant drive source 90.

Figure 6:
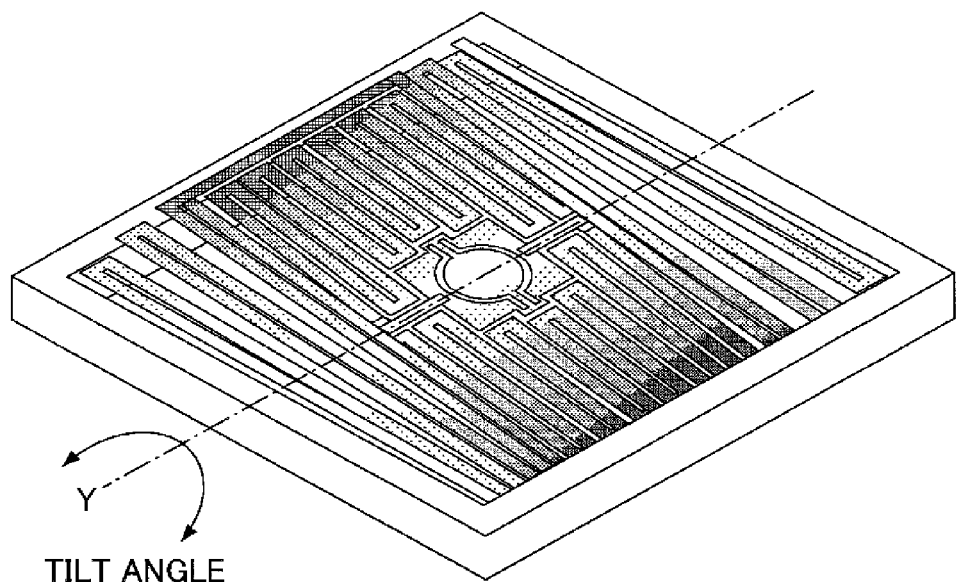
FIG. 6 is a perspective view showing the non-resonant driving state of the actuator of Embodiment 1.

FIG. 6 is a perspective view showing the state where the non-resonant drive is performed by the non-resonant drive source 90 in the actuator of Embodiment 1. As shown in FIG. 6, the tilt angle for each beam 15 of the non-resonant drive source 90 is accumulated and the tilting drive of the mirror 31 is performed around the axis of rotation Y. In FIG. 6, the tilting drive operation in which the right-hand side of the mirror is lowered and the left-hand side of the mirror is lifted is illustrated. In this manner, the actuator of this embodiment can be used as a bi-axial drive actuator which combines the resonant drive part and the non-resonant drive part.

Figure 7:
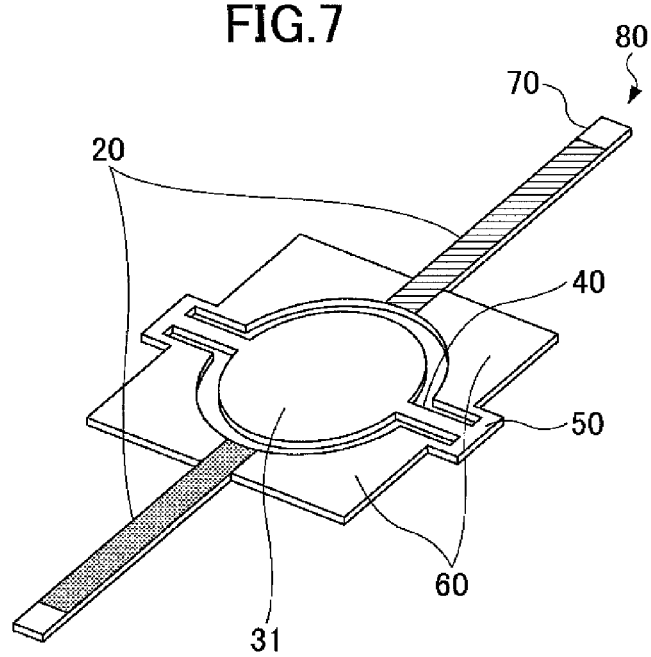
FIG. 7 is a perspective view showing a resonant drive part of the actuator of Embodiment 1.

FIG. 7 is a perspective view showing a resonant drive part 80 of the actuator of Embodiment 1. As shown in FIG. 7, the resonant drive part 80 is constructed to include a mirror 31, supporting beams 40, connection parts 50, movable frames 60, drive beams 70, and drive sources 20, and these elements are connected together to form an integrated part.

The mirror 31 is an object 30 to be driven for a tilting drive operation which is performed by the actuator of this embodiment. The object to be driven may be an object other than the mirror 31. However, for the sake of convenience of description, an example in which the object 30 to be driven is the mirror 31 will be described.

The supporting beams 40 are a pair of beams which support the mirror 31 from both sides thereof. The pair of supporting beams 40 are provided on the right and left sides of the mirror 31 symmetrically around the axis of rotation X and connected to the mirror 31. As previously described with FIG. 1, each supporting beam 40 is formed to include a thin silicon activation layer 14 having a thickness on the order of 30 µm, for example, and this supporting beam functions as an elastic member with elasticity.

The movable frames 60 are a pair of media for transmitting bending vibration and a pair of movable supporting members which support the mirror 31 movably through the supporting beams 40. The movable frames 60 are arranged symmetrically with respect to the axis of rotation X to sandwich the mirror 31 and the supporting beams 40 from both sides thereof. In FIG. 7, the mirror 31 and the supporting beams 40 are sandwiched from both the right-hand side and the left-hand side thereof by the movable frames 60. In the example of FIG. 7, the movable frames 60 as the whole have a rectangular shape. Alternatively, the movable frames 60 may have an arbitrary external shape if the movable frames 60 can support the supporting beams 40 and the mirror 31 from both the sides thereof so as to transmit bending vibration.

The sides of the movable frames 60 are connected to the drive beams 70 each of which functions as a resonant vibration drive part, such that the drive beams 70 sandwich the movable frames 60 from both the sides thereof. Bending vibration from the drive beams 70 is transmitted to the movable frames 60, and the movable frames 60 are a pair of media for transmitting the bending vibration. The drive beams 70 generate bending vibration as shown in FIGS. 2A-2C, 3 and 4. However, the movable frames 60 are formed as a part of the thin-film Si activation layer 14 similar to the supporting beams 40, function as a pair of elastic members with elasticity, and are able to transmit the bending vibration generated by the drive beams 70.

The movable frames 60 are connected to the supporting beams 40 via the connection parts 50. Thereby, the movable frames 60 can transmit the vibration to the supporting beams 40 and support the supporting beams 40. The movable frames 60 are connected to the drive beams 70, but are not secured to a fixed body, such as the outer fixed frame. The movable frames 60 are held in a movable state and the movable frames 60 in the movable state transmit the vibration.

The connection parts 50 connect the movable frames 60 and the ends of the supporting beams 40, convert the bending vibration from the movable frames 60 into torsional vibration, and transmit the torsional vibration to the supporting beams 40. The connection parts 50 are arranged as the pair of connection parts to sandwich the supporting beams 40 from both the sides in the direction of the axis of rotation X. The movable frames 60 are arranged as the pair of movable frames to sandwich the supporting beams 40 from both the sides thereof in the direction perpendicular to the axis of rotation X, and each connection part 50 connects the three components: the supporting beam 40 and the movable frames 60 on the both sides of the supporting beam 40.

Figure 8:
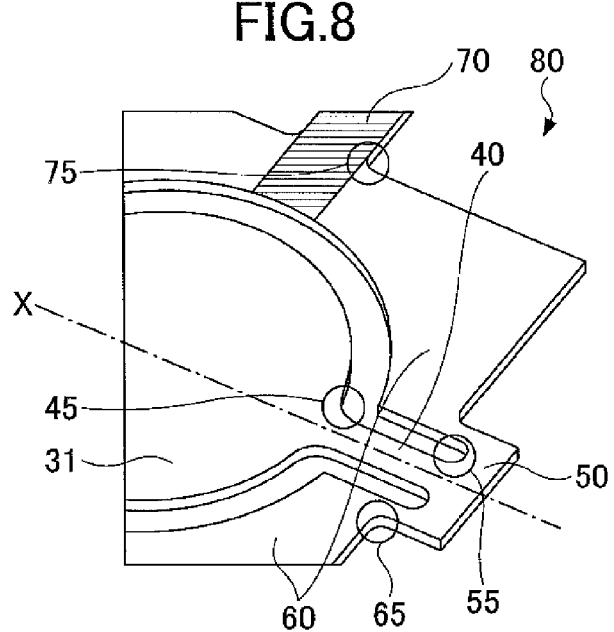
FIG. 8 is an enlarged view of a connection part of the actuator of Embodiment 1.

FIG. 8 is an enlarged view of the connection part 50 in the resonant drive part 80 of the actuator of Embodiment 1. In FIG. 8, the relationship between the mirror 31, the supporting beam 40, the movable frames 60, and the drive beam 70 around the connection part 50 is illustrated.

The connection part 50 may be formed integrally with the supporting beam 40 and the movable frames 60 by using the same material as the supporting beam 40 and the movable frames 60. Thereby, the resistance of the resonant drive part 80 can be increased, and the mechanical strength can be increased from that in a case in which two or more components are connected together.

By forming the connection part 50 integrally with the supporting beam 40 and the movable frames 60, the irregularities in transmitting the vibration can be reduced and the vibration can be smoothly transmitted. Thus, when the supporting beam 40 and the movable frames 60 are constructed by the $SiO_2$ layer 12, the $SiO_2$ layer 14 and the Si activation layer 15 of the semiconductor wafer 10 as shown in FIG. 1, the connection part 50 may also be constructed by the $SiO_2$ layer 12, the $SiO_2$ layer 14, and the Si activation layer 13 of the semiconductor wafer 10.

The connection part 50 may be constituted by a multiple beam structure including two or more slim beams which extend horizontally. By forming the connection part 50 having such a beam structure, the elasticity of the connection part 50 can be increased from that in a case of a connection part having a large width, and the thus formed connection part 50 can convert the bending vibration transmitted from the movable frame 60 into the torsional vibration without causing stress concentrations on a particular portion thereof.

As shown in FIG. 8, an end portion of the supporting beam 40 opposite to the mirror 31 is connected to the connection part 50. The torsional stress when performing the tilting drive of the mirror 31 is applied to this end portion and the maximum stress concentration arises at this end portion. In the actuator of this embodiment, the connection part 50 to which the end portion of the supporting beam 40 is connected is arranged to have a multiple beam structure, and not only the supporting beam 40 but also the connection part 50 can be subjected to torsional deformation according to the torsional stress on the supporting beam 40, and the torsional stress on the supporting beam 40 can be distributed.

The connection part 50 may be formed to project outward. If the connection part 50 is formed to have a beam structure, the elasticity can be increased and the stress distribution can be promoted. Further, if the width of the supporting beams 40 is increased, the torsional stress on the supporting beams 40 can be reduced. When the supporting beams 40 are formed to have a width larger than the width of the movable frames 60 in the direction of the axis of rotation X and the connection parts 50 are formed to have a beam structure projecting outward from the outside of the movable frames 60 according to the supporting beams 40, an increased length of the beam which constitutes each connection part 50 can be taken, and the stress absorptive effect can be increased.

In the example of FIG. 7, the connection parts 50 are formed to have a multiple beam structure that includes a first beam transversely extending from both the sides of the end portion of each supporting beam 40 in the direction perpendicular to the axis of rotation X and a second beam extending in the direction parallel to the axis of rotation X and connecting the end of the first beam and one of the movable frames 60. With this composition, the length of the beam structure of each connection part 50 in the axial direction is increased and the stress distribution efficiency is increased.

A corner 55 formed in a connecting area where the connection part 50 and the supporting beam 40 are connected together may be rounded off by machining. Thereby, the stress concentration in the connecting area between the supporting beam 40 and the connection part 50 can be reduced further. Similarly, the machining to round off a corner 45 formed in the connecting area where the mirror 31 and the supporting beam 40 are connected together, a corner 65 formed in the connecting area where the connection part 50 and the movable frame 60 are connected together, and a corner 75 formed in the connecting area where the movable frame 60 and the drive beam 70 are connected together may be performed, and the stress concentration in these areas may be reduced further. The details of the machining to round off the corners 45, 55, 65 and 75 will be described later.

Referring back to FIG. 7, each of the drive beams 70 is a driving force source which applies bending stress to the movable frame 60. The drive beams 70 are arranged as a pair of drive beams so that the drive beams 70 extend in the directions perpendicular to the axis of rotation X and are connected to the movable frames 60 to sandwich the movable frames 60 from both the sides thereof. In each drive beam 70, the drive source 20 is formed on the surface of the drive beam 70, and the drive beam 70 itself is deformed by the drive source 20 and the drive beam 70 generates bending vibration. For example, the piezoelectric device 21 may be used as the drive source 20. Alternatively, any other device may be used if the device is able to generate bending vibration. When the piezoelectric device 21 is used, the alternating positive/negative voltage and the opposite alternating positive/negative voltage are supplied to the piezoelectric devices 21 in the pair of drive beams 70. The application of such alternating voltage may be performed from the upper electrode 23 and the lower electrode 24 provided on the piezoelectric crystal 22 as previously described with FIG. 1.

The drive beams 70 may be formed integrally with the movable frames 60. Thus, when the movable frames 60 are formed by a thin-film portion which has a thickness that is the same as a thickness of the beam 15 of the semiconductor wafer 10 shown in FIG. 1, the drive frames 70 may also be formed by the thin-film portion having the same thickness as the beam 15

The resonant drive part 80 is constructed by the thin-film portion of the semiconductor wafer 10 having a thickness on the order of 30 μm, and this thin-film portion functions as an elastic member with elasticity. The thickness of the resonant drive part 80 is constant, and the elasticity thereof may be adjusted by changing the width, the length, the configuration, etc. of the resonant drive part 80. In the actuator of this embodiment, the elasticity of the semiconductor wafer 10 may be adjusted by changing the configuration thereof, and the stress distribution efficiency may be increased. It is possible to provide an actuator which does not cause a problem, such as fracture by stress.

Figure 9:
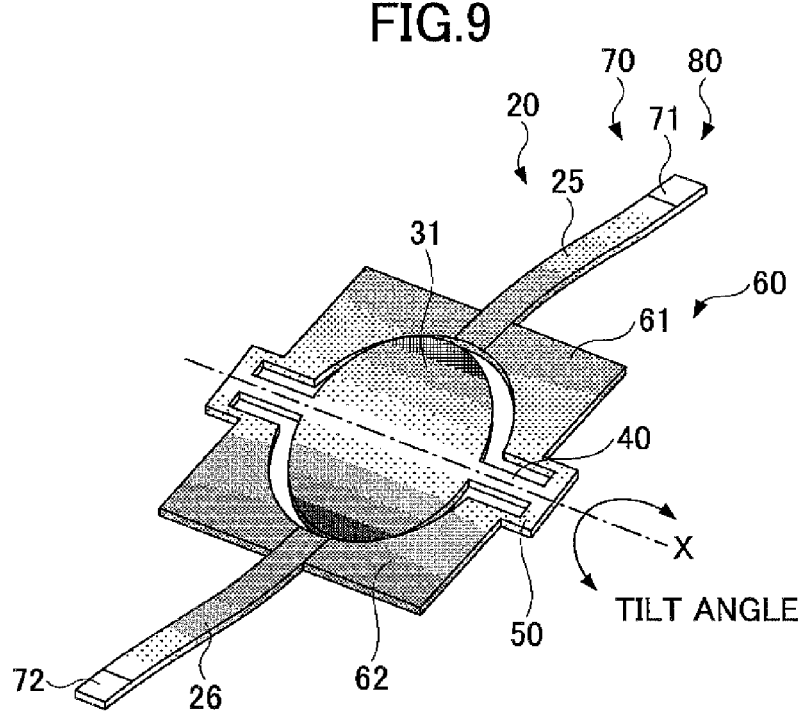
FIG. 9 is a perspective view showing a deformed state of the actuator of Embodiment 1 during a resonant drive vibration.

FIG. 9 is a perspective view showing a deformed state of the resonant drive part 80 of the actuator of Embodiment 1 during a resonant drive vibration. As shown in FIG. 9, the pair of drive sources 20 include a piezoelectric device 25 on the right-hand side and a piezoelectric device 26 on the left-hand side, and the alternating voltage and the opposite alternating voltage with different polarities or phases are supplied to the devices 25 and 26 respectively. Thereby, in the pair of drive beams 70, the drive beam 71 on the right-hand side is curved upward and the drive beam 72 on the left-hand side is curved downward, and the drive beams 70 apply bending vibration to the movable frames 60. The bending vibration in the movable frames 60 is transmitted to the supporting beams 40 via the connection parts 50. At this time, the bending vibration is converted into torsional vibration, and the pair of supporting beams 40 are subjected to the torsional vibration around the axis of rotation X. By the torsional vibration, the mirror 31 which is supported from both the sides thereof by the supporting beams 40 is subjected to the tilting drive movement around the axis of rotation X. By this operation, the mirror 31 is tilted and driven around the axis of rotation X.

Figure 10:
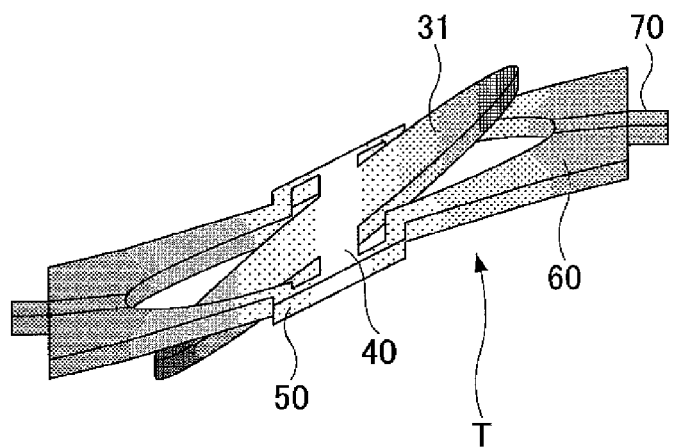
FIG. 10 is an enlarged diagram showing a deformed state of a mirror in the actuator of Embodiment 1 during a resonant drive vibration.

FIG. 10 is an enlarged diagram showing a deformed state of the mirror 31 of the resonant drive part 80 of the actuator of Embodiment 1 during a resonant drive vibration. As shown in FIG. 10, the mirror 31 is tilted and driven so that the right-hand side of the mirror 31 is lifted and the left-hand side of the mirror 31 is lowered. The movable frames 60 are also tilted in the same directions as the mirror 31. The tilt angle of the mirror 31 in the tilted state is larger than that of the movable frames 60. In the resonant drive vibration of FIG. 10, the alternating voltage and the opposite alternating voltage with different polarities or phases are supplied to the pair of drive sources 20 in the pair of drive beams 70, the portion near the connecting area between the drive beam 70 and the movable frame 60 is greatly vibrated up and down by the resonant drive vibration. By this operation, the movable frame 60 is inclined, the portion in the vicinity of the connection part 50 is inclined by the bending deformation of the movable frame 60, and the connection part 50 is twisted, so that the mirror 31 is tilted.

There are two or more resonant vibration modes including a resonant vibration mode in which the mirror 31 and the movable frame 60 are inclined in the same direction as shown in FIG. 10, and a resonant vibration mode in which the mirror 31 and the movable frame 60 are inclined in the mutually opposite directions.

However, it is preferred for the actuator of this embodiment to select the resonant vibration mode in which the mirror 31 and the movable frame 60 are inclined in the same direction as shown in FIG. 10. Thereby, the displacement of the mirror 31 is added to the displacement of the movable frame 60, and the tilt angle sensitivity of the mirror 31 to the supplied voltage can be increased. Although the connection part 50 is twisted, the amount of twisting relative to the tilt angle of the mirror 31 is very small. The internal stress can be made small, so that occurrence of fracture can be avoided.

Figure 11:
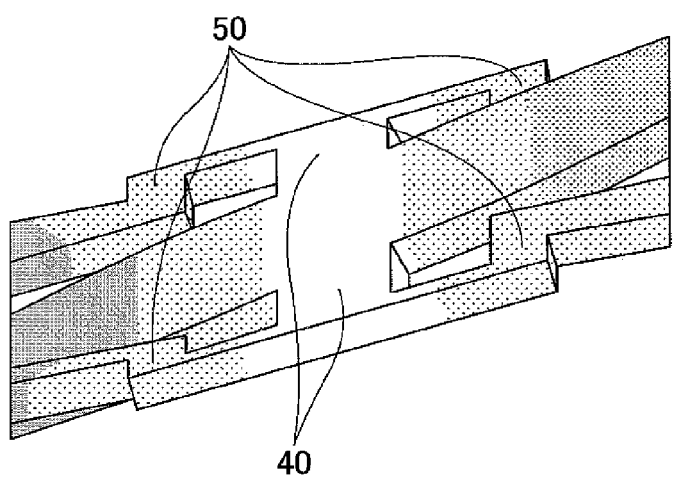
FIG. 11 is an enlarged diagram showing the mirror, the connection parts and the supporting beams in the actuator of Embodiment 1 in the deformed state of FIG. 10.

FIG. 11 is an enlarged diagram showing the mirror 31, the supporting beams 40 and the connection parts 50 in the actuator of Embodiment 1 in the deformed state of FIG. 10. As shown in FIG. 11, even when the connection parts 50 and the supporting beams 40 near the connection parts 50 are not twisted greatly, the tilt angle of the mirror 31 can be secured by the twisting of the connection parts 50. Thus, in the resonant drive part 80 of the actuator of this embodiment, the connection part 50 having the beam structure is provided in the area between the movable frame 60 and the supporting beam 40 to which large stress loads due to the conversion of bending stress into torsional stress are applied, and a sufficient tilt angle of the mirror 31 can be provided and the angle of twisting between the connection part 50 and the supporting beam 40 can be reduced.

When the machining to round off the corners 45, 55, 65 and 75 as shown in FIG. 8 is performed and the actuator of this embodiment is activated to drive the mirror 31 at the frequency of about 30 kHz and with the tilt angle width of ±12 deg., the maximum internal stress in the connection parts 50 is below 0.4 GPa. This shows that the stress generated in the tilting drive state of the mirror 31 is distributed to the connection parts 50, the movable frames 60 and the drive beams 70.

In the actuator of this embodiment, the resonance frequency can be adjusted by changing the width, the thickness, the cross-sectional shape, the length, etc. of the connection part 50, and it is applicable to high speed tilting drive operations of 30 kHz or higher without changing the structure of the actuator. However, if the shape of the connection part 50 is changed, the dimensions of the supporting beams 40 and the drive beams 70 may be changed accordingly.

Next, some examples of the machining to round off the corners of the actuator of this embodiment will be described with reference to FIGS. 12A-14B.

Figure 12A:
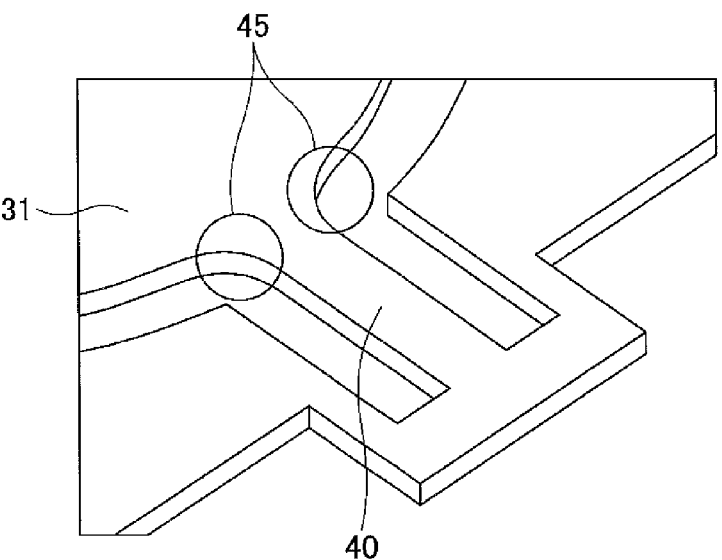
FIG. 12A is a diagram for explaining the composition of the actuator in which a rounded corner is formed in a connecting area.
Figure 12B:
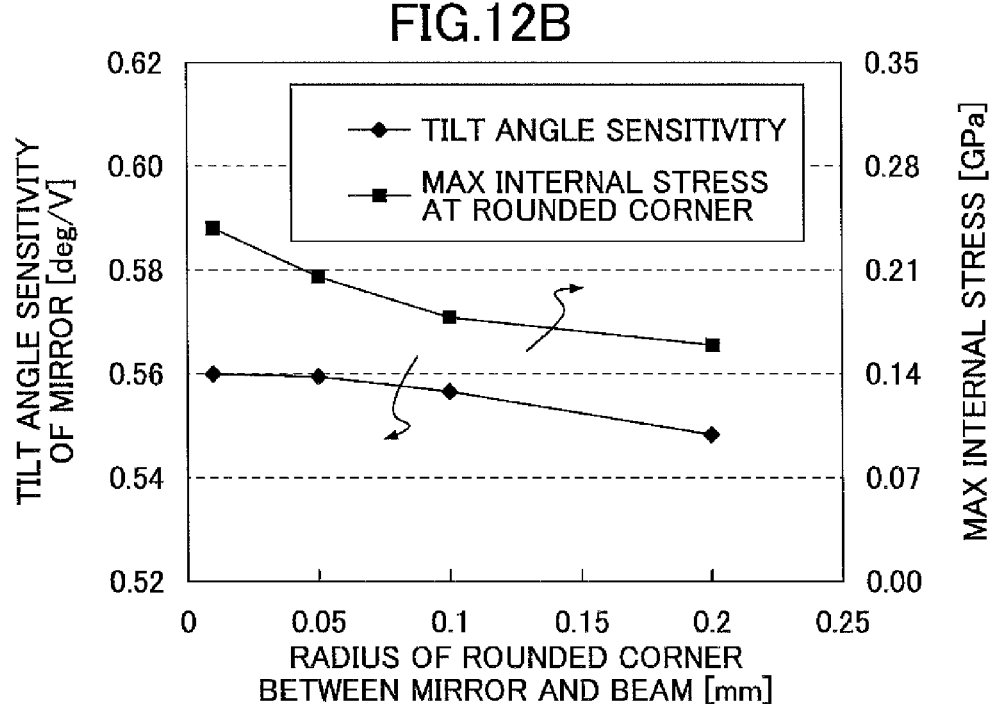
FIG. 12B is a diagram for explaining the composition of the actuator in which the rounded corner is formed in the connecting area.

FIG. 12A and FIG. 12B are diagrams for explaining the composition of the actuator in which a rounded corner is formed in a connecting area 45 between the mirror 31 and the supporting beam 40. FIG. 12A is a perspective view of the actuator in which a rounded corner is formed in the connecting area 45 between the mirror 31 and the supporting beam 40. FIG. 12B is a diagram showing a change of the tilt angle sensitivity and a change of the maximum stress in the connecting area 45 at the tilt angles of ±12 deg. when the radius R of the rounded corner is changed.

As shown in FIG. 12A, the mirror 31 has a circular shape and the supporting beam 40 has a rectangular shape, and if the rounding of the corner is not performed, the corner may have a sharp edge on the outside periphery of the connecting area 45 between the mirror 31 and the supporting beam 40. Such a sharp edge may easily concentrate the internal stress on the corner. By forming the rounded corner, the internal stress can be distributed. For example, the radius R of the rounded corner formed is in a range of 0.01-0.2 mm.

As shown in FIG. 12B, when the radius R of the rounded corner is changed in a range of 0-0.25 mm, the tilt angle sensitivity is not changed greatly, and it is slightly reduced when the radius R of the rounded corner is 0.01 mm or larger. On the other hand, as shown in FIG. 12B, the maximum internal stress of the rounded corner (the connecting area 45) is below 0.3 GPa, and this value is below 0.05 GPa that is indicated by the fracture stress value multiplied by the safety coefficient. It can be understood that there is no problem on the durability of the rounded corner.

Figure 13A:
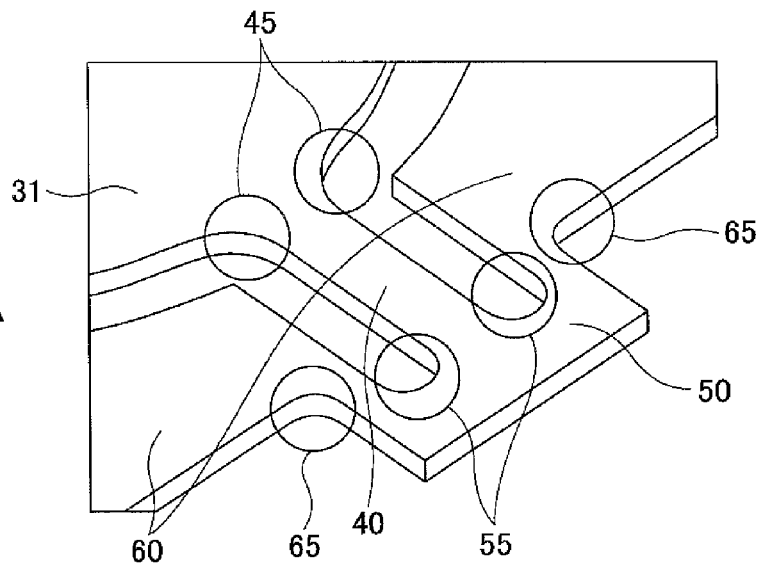
FIG. 13A is a diagram for explaining the composition of the actuator in which a rounded corner is formed in a connecting area.
Figure 13B:
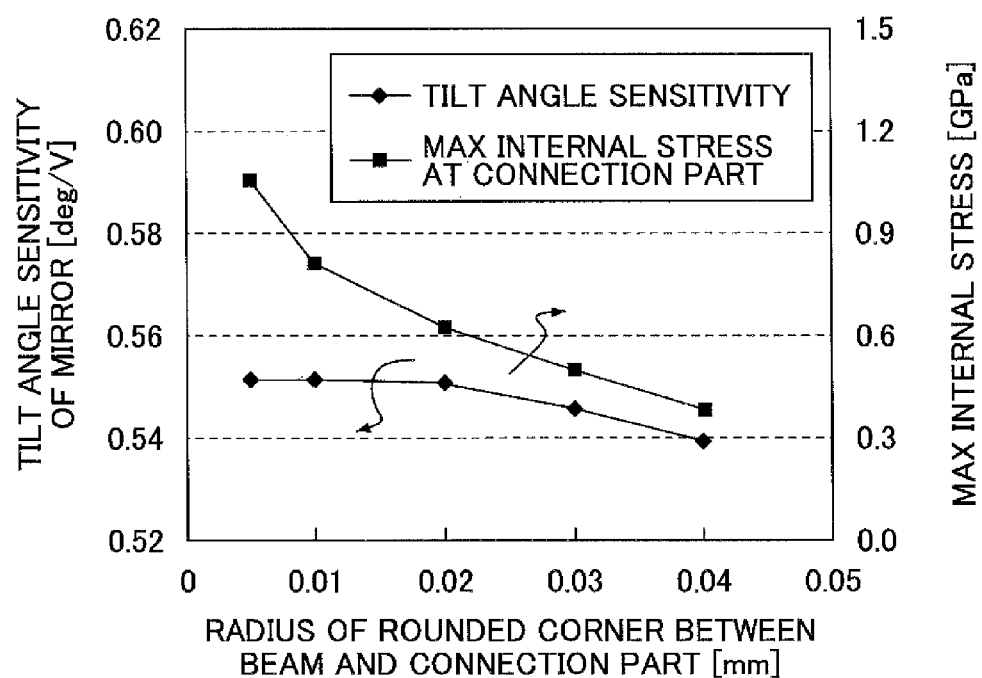
FIG. 13B is a diagram for explaining the composition of the actuator in which the rounded corner is formed in the connecting area.

FIG. 13A and FIG. 13B are diagrams for explaining the composition of the actuator in which rounded corners are formed in the connecting area 45 between the mirror 31 and the supporting beam 40, the connecting area 55 between the supporting beam 40 and the connection part 50, and the connecting area 65 between the connection part 50 and the movable frame 60. FIG. 13A is a perspective view of the actuator in which the rounded corners are formed in the connecting areas 45, 55 and 65. FIG. 13B is a diagram showing a change of the tilt angle sensitivity and a change of the maximum stress in the connecting areas 45, 55 and 65 at the tilt angles of ±12 deg. when the radius R of the rounded corner is changed.

As shown in FIG. 13A, the rounded corners are formed in the connecting area 45 between the mirror 31 and the supporting beam 40, the connecting area 55 between the supporting beam 40 and the connection part 50, and the connecting area 65 between the connection part 50 and the movable frame 60. For example, the radius R of each rounded corner in the connecting areas 55 and 65 may be in a range of 0.005-0.04 mm.

FIG. 13B shows a change of the tilt angle sensitivity and a change the maximum stress in the composition which includes the rounded corners as shown in FIG. 13A. As shown in FIG. 13B, the tilt angle sensitivity is not changed greatly, but is slightly reduced when the radius R of the rounded corner is 0.02 mm or larger. The internal stress becomes the maximum in the connection part 50 where the torsion takes place. When R=0.005-0.02 mm, the maximum internal stress is 0.5 GPa and a possibility of fracture due to the influence of a damaged layer and the application of repeated stress by the deep reactive ion etching exists. When R=0.03 mm, the maximum internal stress is 0.49 GPa and the stresses are distributed to the value that does not cause fracture. Therefore, it can be understood that if the radius R of the rounded corner is above 0.03 mm, no problem, such as fracture, arises.

Figure 14A:
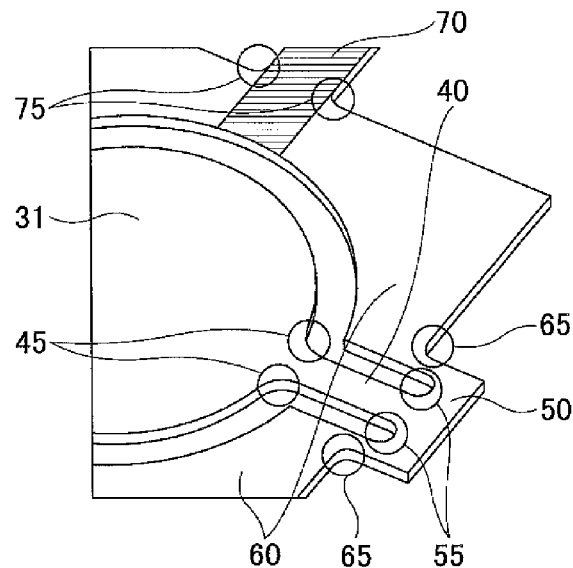
FIG. 14A is a diagram for explaining the composition of the actuator in which a rounded corner is formed in a connecting area.
Figure 14B:
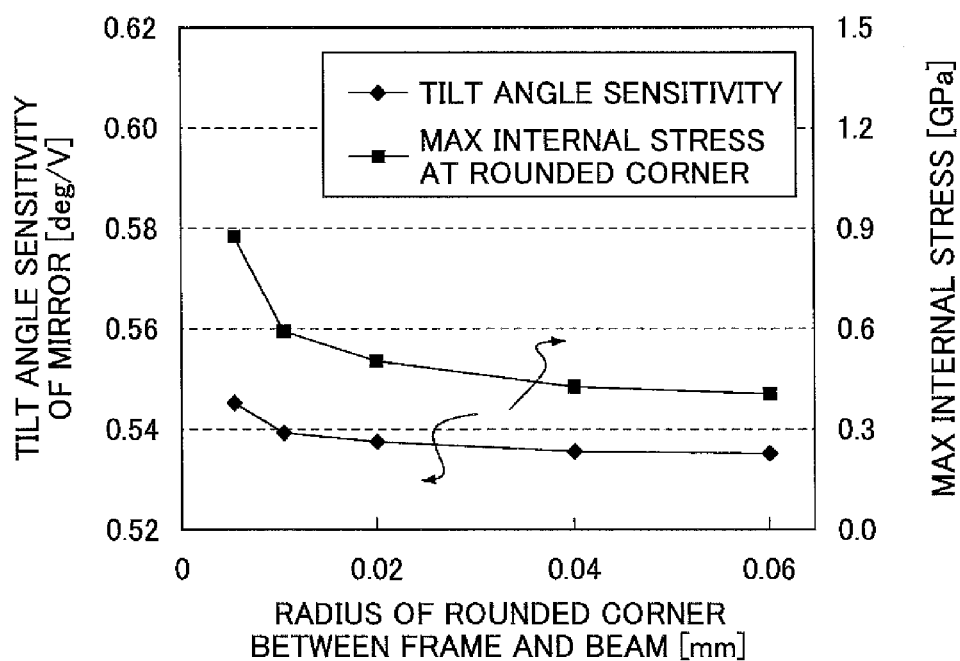
FIG. 14B is a diagram for explaining the composition of the actuator in which the rounded corner is formed in the connecting area.

FIG. 14A and FIG. 14B are diagrams for explaining the composition of the actuator in which a rounded corner is formed in each of the connecting area 45 between the mirror 31 and the supporting beam 40, the connecting area 55 between the supporting beam 40 and the connection part 50, the connecting area 65 between the connection part 50 and the movable frame 60, and the connecting area 75 between the movable frame 60 and the drive beam 70. FIG. 14A is a perspective view of the actuator in which rounded corners are formed in the connecting areas 45, 55, 65 and 75. FIG. 14B is a diagram showing a change of the tilt angle sensitivity and a change of the maximum stress of the connecting areas 45, 55, 65 and 75 at the tilt angles of ±12 deg. when the radius R of each rounded corner is changed.

As shown in FIG. 14A, the rounded corner is formed also in the connecting area 75 between the movable frame 60 and the drive beam 70, and the internal stress in the connecting area 75 can be distributed by performing the machining to form the rounded corner. For example, the radius R of the rounded corner in the connecting area 75 is in a range of 0.005-0.06 mm.

As shown in FIG. 14B, in the case in which the rounded corners are formed in the connecting areas 45, 55, 65 and 75 as shown in FIG. 14A, the maximum internal stress in the rounded corner whose radius R is in a range of 0.005-0.01 mm is on the order of 0.5 GPa. That is, in the actuator of this embodiment, there is a problem of fracture due to the influence of a damaged layer and the application of repeated stress by the deep reactive ion etching.

On the other hand, when R=0.02 mm, the maximum internal stress in the connecting areas 45, 55, 65 and 75 is 0.49

GPa, and the stresses are distributed to the value that does not cause fracture. It can be understood that if the radius R of each rounded corner is larger than 0.05 mm, no problem of fracture arises.

Next, some examples of the electrode arrangement of the drive sources 20 of the resonant drive part 80 of the actuator of Embodiment 1 will be described with reference to FIGS. 15A-15C and 16.

Figure 15A:
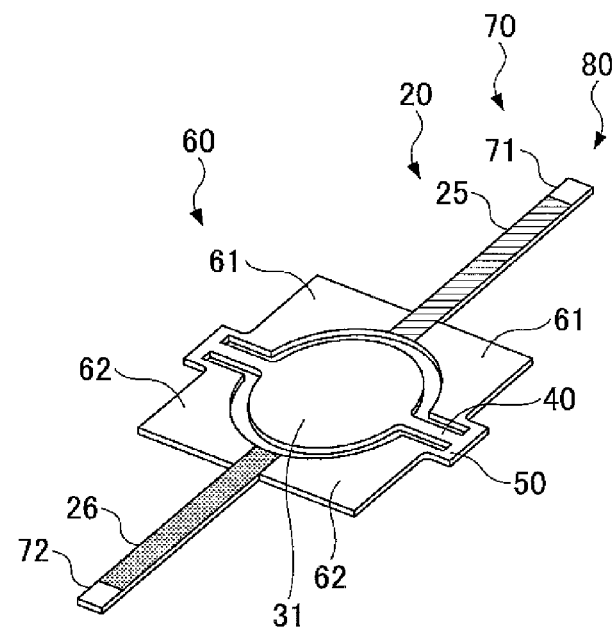
FIG. 15A is a diagram showing the arrangement of electrodes of drive sources of the resonant drive part of the actuator of Embodiment 1.
Figure 15B:
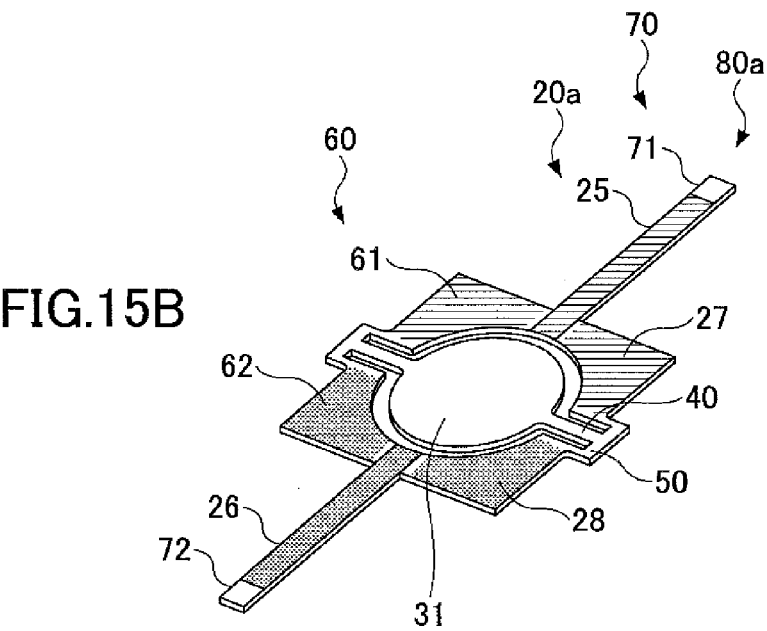
FIG. 15B is a diagram showing the arrangement of electrodes of drive sources of the resonant drive part of the actuator of Embodiment 1.
Figures 15C, 16:
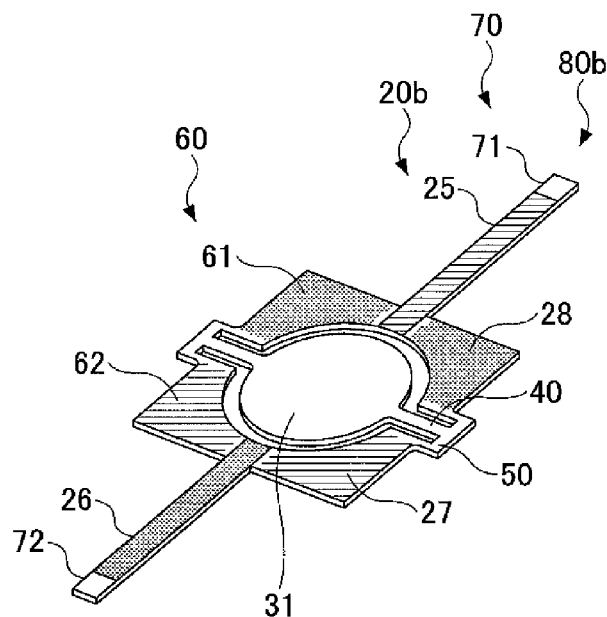
FIG. 15C is a diagram showing the arrangement of electrodes of drive sources of the resonant drive part of the actuator of Embodiment 1.
FIG. 16 is a diagram showing the relationship between tilt angle sensitivity and maximum internal stress of the resonant drive part of each of the electrode arrangements of FIG. 15A, FIG. 15B, and FIG. 15C.

FIGS. 15A-15C are diagrams showing the electrode arrangement of the drive sources 20 in the resonant drive part 80. FIG. 15A is a diagram showing the composition of the resonant drive part 80 in which the drive sources 20 are provided only in the drive beams 70. In FIG. 15A, the resonant drive part 80 in which the drive sources 20 are provided only in drive beams 70 is shown. In this case, as shown in FIGS. 7-11, the up-and-down vibration of the drive beams 70 which include the pair of drive beams 71 and 72 is given to the movable frames 60 which include the pair of movable frames 61 and 62 as bending vibration. When the bending vibration from the movable frames 60 is transmitted to the connection parts 50, the bending vibration is converted into torsional vibration and the tilting drive operation of the supporting beams 40 and the mirror 31 is performed by the torsional vibration.

FIG. 15B is a diagram showing the composition of the resonant vibration part 80a in which the drive sources 20a are provided on the drive beams 70 and the movable frames 60. As shown in FIG. 15B, the drive sources 20a are provided on the drive beams 70 and on the movable frames 60. Specifically, the drive sources 20a include the pair of drive sources 25 and 26 provided on the pair of drive beams 71 and 72 respectively and the pair of drive sources 27 and 28 provided on the pair of movable frames 61 and 62 respectively. In the case of FIG. 15B, symmetrically with respect to the axis of rotation X, the drive source 25 and the drive source 27 to which the voltage of the same polarity or same phase is supplied are provided on the drive beam 71 and the movable frame 61 on the right-hand side which are connected together, the drive source 26 and the drive source 28 to which the voltage of the same polarity or same phase is supplied are provided on the drive beam 72 and the movable frame 62 on the left-hand side which are connected, and the polarity of the voltage supplied to the drive sources 26 and 28 is opposite to that supplied to the drive sources 25 and 27. In the case of FIG. 15B, the drive sources 20a are arranged so that the voltage of the same polarity may be supplied to the drive beams 70 and the movable beams 60 on the same side.

FIG. 15C is a diagram showing the composition of a resonant vibration part 80b in which drive sources 20b are provided on the drive beams 70 and the movable frames 60 in a manner different from that in the case of FIG. 15B. In the case of FIG. 15C, the arrangement of the drive sources 20b provided on the drive beams 70 is the same as that in the cases of FIGS. 15A and 15B, but the polarity of the voltage supplied to the drive sources 27 and 28 provided on the movable frames 60 is opposite to the polarity of the voltage supplied to the drive source 26 and the drive source 25 provided on the drive beams 70. Namely, the polarity of the voltage supplied to the drive source 25 on the drive beam 71 on the right-hand side around the axis of rotation X, and the polarity of the voltage supplied to the drive source 28 on the movable frame 61 connected to the drive beam 71 are opposite to each other. Similarly, the polarity of the voltage supplied to the drive source 26 on the drive beam 72 on the left-hand side, and the polarity of the voltage supplied to the drive source 27 on the movable frame 62 connected to the drive beam 72 are opposite to each other. The drive sources 25 and 26 on the pair of drive beams 71 and 72 are related to the mutually opposite polarities of the voltage supplied, and the drive sources 28 and 27 on the pair of movable frames 61 and 62 are related to the mutually opposite polarities of the voltage supplied.

FIG. 16 is a diagram showing the relationship between the tilt angle sensitivity per unit voltage and the maximum internal stress of each of the three examples of the electrode arrangement of the resonant drive parts 80, 80a and 80b shown in FIGS. 15A-15C.

With reference to FIG. 16, the tilt angle sensitivity per unit voltage will be compared between the examples. The composition of the actuator in which the drive sources 20 are provided only on the drive beams 70 as shown in FIG. 15A will be considered a standard composition.

When compared with the standard composition, the tilt angle sensitivity decreases in the composition of FIG. 15B in which the drive sources 20a on the drive beam 70 and the movable frame 60 on the same side are related to the same polarity of the voltage supplied, and the tilt angle sensitivity increases in the composition of FIG. 15C in which the drive sources 20b on the drive beams 70 and the movable frames 60 on the same side are related to the mutually opposite polarities of the voltage supplied. The tilt angle sensitivity in the composition of FIG. 15A is 0.535 deg/V, the tilt angle sensitivity in the composition of FIG. 15B is lowered to 0.131 deg/V, and the tilt angle sensitivity in the composition of FIG. 15C is lifted to 0.975 deg/V.

With reference to FIG. 16, the maximum internal stress will be compared between the examples of FIG. 15A, FIG. 15B and FIG. 15C. The composition of FIG. 15A will be considered a standard composition. The maximum internal stress in the composition of FIG. 15A is 0.39 GPa. The maximum internal stress in the composition of FIG. 15C is nearly equal to 0.40 GPa, and it can be understood that the composition of FIG. 15C shows a satisfactory value for eliminating the problem of fracture due to the stresses. However, the maximum internal stress in the composition of FIG. 15B increases to 0.59 GPa, this maximum internal stress exceeds 0.5 GPa, and the problem of fracture due to the stresses may arise.

Consequently, it can be understood that the actuator having the composition of FIG. 15C has the highest value of the tilt angle sensitivity and does not have a problem on the maximum internal stress. Therefore, the composition of FIG. 15C in which the drive sources 20b are provided on both the drive beam 70 and the movable frame 60 such that the polarities of the voltage supplied to the drive sources 20b on the drive beam 70 and the movable frame 60 which are connected together are opposite to each other, is the most efficient and does not cause the problem of fracture by the stresses.

Thus, by using the electrode arrangement shown in FIG. 15C, the tilt angle sensitivity can be improved without changing the outside dimensions. For example, in the example of FIG. 16, the tilt angle sensitivity is increased 1.8 times and the supplied voltage can be reduced to 1/1.8. The drive voltage required for the tilt angle range of ±12 deg. of the mirror 31 is in a range of 0-22.5 V in the composition of FIG. 15A, and the required drive voltage in the composition of FIG. 15C can be reduced to a range of 0-12.5 V. In this case, because the power dissipation is proportional to the square of the supplied voltage, the power dissipation in the composition of FIG. 15C can be reduced to $(1/1.8)^2 \times 100 = 30\%$ of the power dissipation in the composition of FIG. 15A.

When the polarities of the voltage supplied to the drive sources on the drive beam 70 and the movable frame 60 connected together are opposite to each other, the tilt angle sensitivity can be increased. Because the directions of elastic deformation of the piezoelectric devices in the drive sources related to the opposite polarities of the supplied voltage are opposite to each other, a large bending vibration can be generated.

As described above, in the actuator of Embodiment 1, the connection part 50 is provided to link the movable frame 60 connected to the drive beam 70 having the drive source 20 provided thereon, to the supporting beam 40 connected to the mirror 31. By using the connection part 50, the bending vibration can be converted into the torsional vibration without increasing the internal stresses, and the tilting drive operation of the mirror 31 can be performed. The machining to form the rounded corners in the connecting areas 45, 55, 65 and 75 may be performed. The drive sources 20b may be provided on the drive beam 70 and the movable frame 60. The polarities of the voltage supplied to the drive sources 20b on the drive beam 70 and the movable frame 60 connected together may be opposite to each other. According to the actuator of Embodiment 1, the tilt angle sensitivity can be improved and the internal stress distribution effect can be acquired.

Embodiment 2

Figure 17:
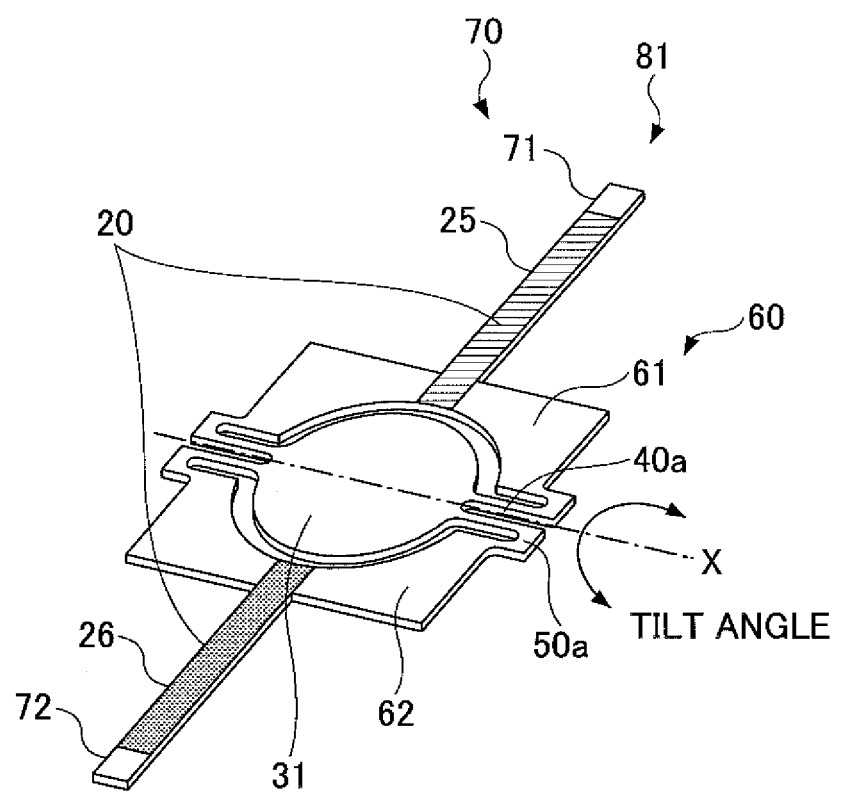
FIG. 17 is a perspective view showing the composition of an actuator of Embodiment 2 of the present disclosure.

FIG. 17 is a perspective view showing the composition of a resonant drive part 81 of an actuator of Embodiment 2 of the present disclosure. As shown in FIG. 17, the resonant drive part 81 of the actuator of Embodiment 2 includes a mirror 31, supporting beams 40a, connection parts 50a, movable frames 60, drive beams 70, and drive sources 20. The actuator of Embodiment 2 has the same composition as the actuator of Embodiment 1 except for the cross-sectional configuration and the composition of the resonant drive part 81, such as a non-resonant drive part, and a description thereof will be omitted. The elements in Embodiment 2 which are the same as corresponding elements in Embodiment 1 are designated by the same reference numerals, and a description thereof will be omitted or simplified.

As shown in FIG. 17, in the actuator of Embodiment 2, the pair of supporting beams 40a are arranged to support the mirror 31 from both sides thereof, and each of the pair of connection parts 50a connects one of the pair of movable frames 60 (which include movable frames 61 and 62) and one of the pair of supporting beams 40a. The basic composition of the actuator of Embodiment 2 in which the pair of drive beams 70 (which include drive beams 71 and 72) are connected to the both sides of the movable frames 60 in the direction perpendicular to the axis of rotation X and the pair of drive sources 20 (which include drive sources 25 and 26) are provided on the drive beams 71 and 72 is essentially the same as that of the actuator of Embodiment 1. Also, operation of the actuator of Embodiment 2 is essentially the same as that of the actuator of Embodiment 1 in that bending vibration on the drive beams 70 generated by the drive sources 20 is converted into torsional vibration by the connection parts 50a and a tilting drive operation of the mirror 31 is performed through the supporting beams 40a.

The actuator of Embodiment 2 differs from the actuator of Embodiment 1 in that each of the supporting beams 40a on the both sides of the mirror 31 is divided along the direction parallel to the axis of rotation X into two supporting beam portions. In addition, the actuator of Embodiment 2 differs from the actuator of Embodiment 1 in that because one of the supporting beams 40a on one side of the mirror 31 includes two supporting beam portions, each of the connection parts 50a on one side of the mirror 31 is arranged to connect one of the two supporting beam portions of the supporting beam 40a to one of the movable frames 61 and 62 which is nearer to the connection part 50a.

Figure 18:
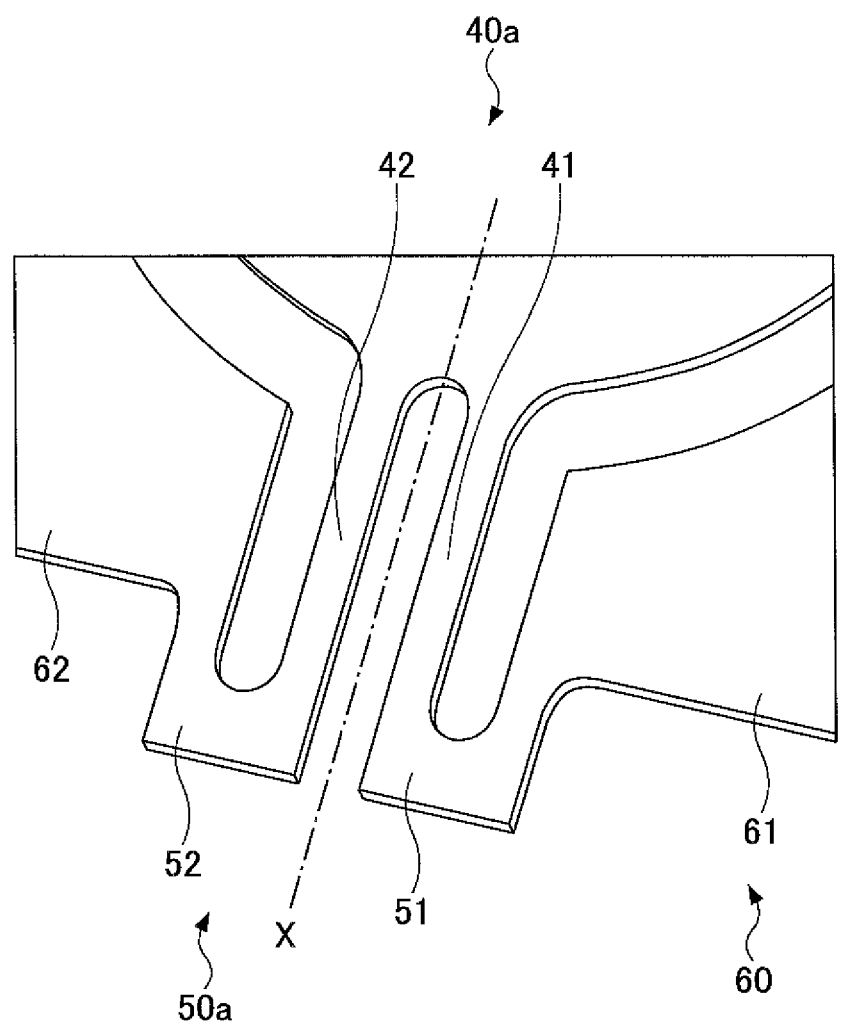
FIG. 18 is an enlarged perspective view of the actuator of Embodiment 2.

FIG. 18 is an enlarged perspective view showing the supporting beam 40a, the connection part 50a, and the movable frames 60 in the actuator of Embodiment 2.

Although the number of supporting beams 40 on one side in the actuator of Embodiment 1 is one, the central part of each supporting beam 40a in the actuator of Embodiment 2 in FIG. 18 is arranged to have a recessed configuration along the axis of rotation X. In addition, the width of each supporting beam 40a is made small and the supporting beam 40a includes two slim beam portions having a width smaller than that of the supporting beam 40 of Embodiment 1.

If it is assumed that the two supporting beams 40a form a single large supporting beam 40, the connection part 50a transversely extends from both sides in the direction perpendicular to the axis of rotation X and is connected to the movable beam 60 along the axis of rotation X. The connection part 50a has a multiple beam structure and the configuration of the connection part 50a itself remains unchanged. However, because the supporting beam 40a is constituted by the two beam portions 41 and 42, the connection part 50a is formed to include a connection part 51 corresponding to the beam portion 41 and a connection part 52 corresponding to the beam portion 42, so that the connection parts 51 and 52 of the connection part 50a correspond to the beam portions 41 and 42 of the connection part 50a respectively.

Accordingly, in the actuator of Embodiment 2, it is possible to provide the portion of the beam structure of each connection part 50a which is longer than that in the actuator of Embodiment 1, and it is possible to perform the operation on the connection part 51 and the operation on the connection part 52 in a different manner. Thus, the flexibility of deformation of the connection parts 50a can be increased and the bending vibration transmitted from the movable frames 60 can be converted into torsional vibration more efficiently.

Figure 19:
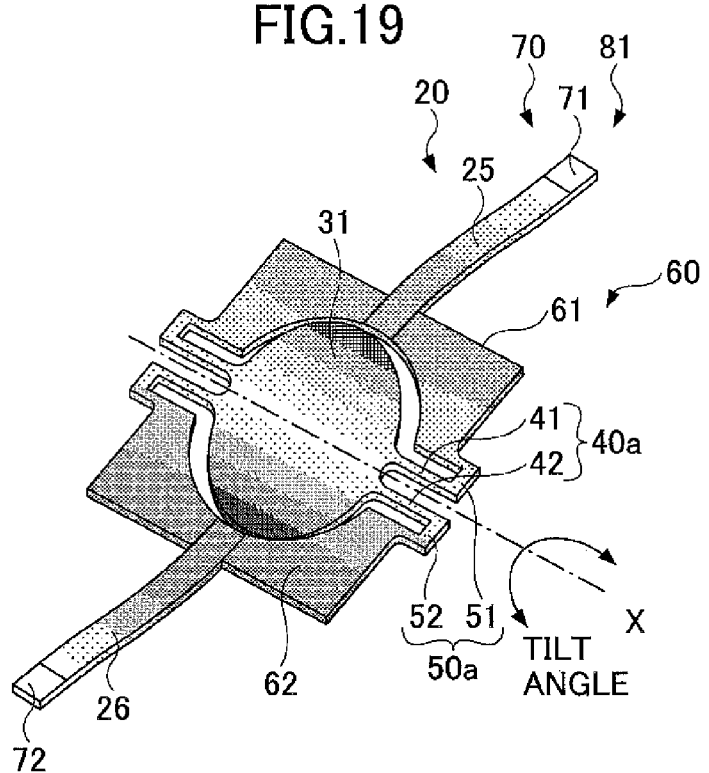
FIG. 19 is a diagram showing the resonant drive state of the actuator of Embodiment 2.

FIG. 19 is a diagram showing a deformed state of a resonant drive part 81 of the actuator of Embodiment 2 during a resonant drive vibration. In FIG. 19, the alternating voltage and the opposite alternating voltage with different polarities are supplied to the drive source 25 and the drive source 26, the drive beam 71 is curved upward, and the drive beam 72 is curved downward so that bending vibration is applied to the pair of the movable frames 61 and 62. The bending vibration applied to the movable frames 61 and 62 is transmitted to the connection parts 50a, the bending vibration is converted into torsional vibration and transmitted to the supporting beams 40a. At this time, the bending vibration of the movable frame 61 is transmitted to the connection part 51 and the bending vibration of the movable frame 62 is transmitted to the connection part 52, which is differs from the actuator of Embodiment 1. The torsional vibration from the connection part 51 is transmitted to the supporting beam 41 and the torsional vibration from the connection part 52 is transmitted to the connection part 52. Not only the right-hand side supporting beam 40a but also the left-hand side supporting beam 40a performs the same operation, and the tilting drive operation of the mirror 31 is performed.

Figure 20:
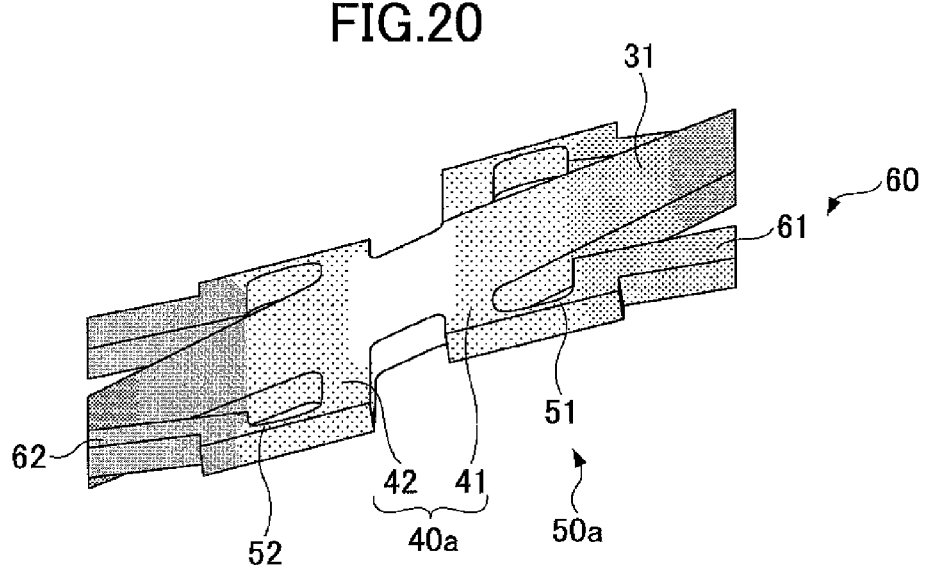
FIG. 20 is an enlarged perspective view showing the resonant drive state of the actuator of Embodiment 2.

FIG. 20 is an enlarged perspective view showing a deformed state of the resonant drive part 81 of the actuator of Embodiment 2 during a resonant drive vibration. In FIG. 20, the deflection of the movable frames 61 and 62 by the bending vibration transmitted from the drive beams 71 and 72 is transmitted to the connection part 50a, and, in the connection part 50a, a level difference between the upper connection part 51 and the lower connection part 52 is produced. Because of the level difference in the connection part 50a, a level difference between the upper supporting beam 41 and the lower supporting beam 42 in the supporting beam 40a is also produced. If the level difference is increased, the tilt angle of the mirror 31 can be increased. This makes it possible to perform the tilting drive operation of the mirror 31 more directly. By arranging the supporting beam 40a to have the two beam portions, a level difference between the beam portions 41 and 42 can be formed when the beam portions 41 and 42 are twisted, and the tilt angle of the mirror 31 can be increased.

The movable frame 60 and the mirror 31 are inclined in the same direction in FIG. 20. Also in the actuator of Embodiment 2, by using the resonance mode in which the mirror 31 and the movable frame 60 are inclined in the same direction, the displacement of the movable frame 60 is added to the displacement of the mirror 31 in the resonance mode, and the tilt angle sensitivity of the mirror 31 can be increased.

Although both the supporting beam 40a and the connection part 50a are twisted and both the drive beam 70 and the movable frame 60 are deformed, the amount of the torsional deformation is small relative to the value of the tilt angle, and it is possible to provide the actuator in which the internal stress is small and fracture does not easily takes place.

For example, if the rounded corners are formed and the actuator of this embodiment is activated to drive the mirror 31 at the frequency of 30 kHz and with the tilt angle width of ±12 deg., the maximum internal stress is set to 0.5 GPa. This shows that the stress generated in the tilting drive state of the mirror 31 is distributed to the supporting beams 40a, the connection parts 50a, the movable frames 60 and the drive beams 70. Specifically, the actuator of this embodiment can set the mirror tilt angle sensitivity to 0.56 deg/V and can set the maximum internal stress to 0.48 GPa.

In the actuator of Embodiment 2, the resonance frequency can be adjusted by changing the width, the thickness, the cross-sectional shape, the length, etc. of both or either of the supporting beam 40a and the connection part 50a, and it is applicable to high speed tilting drive operations of 30 kHz or higher without changing the structure of the actuator. However, if the shape of the supporting beam 40a and/or the connection part 50a is changed, the dimensions of the movable frames 60 and the drive beams 70 may be changed accordingly.

Next, some examples of the electrode arrangement of the resonant drive part 81 of the actuator of Embodiment 2 will be described with reference to FIGS. 21A-21C and 22.

Figure 21A:
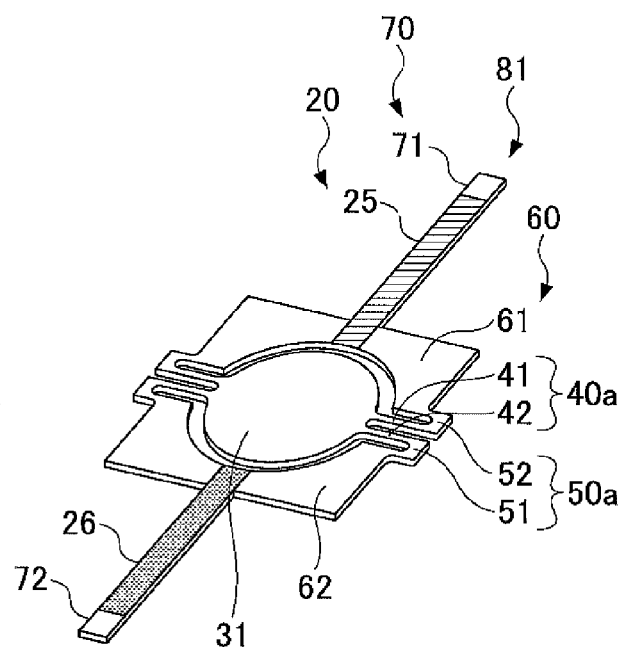
FIG. 21A is a diagram showing the arrangement of electrodes of the actuator of Embodiment 2.
Figure 21B:
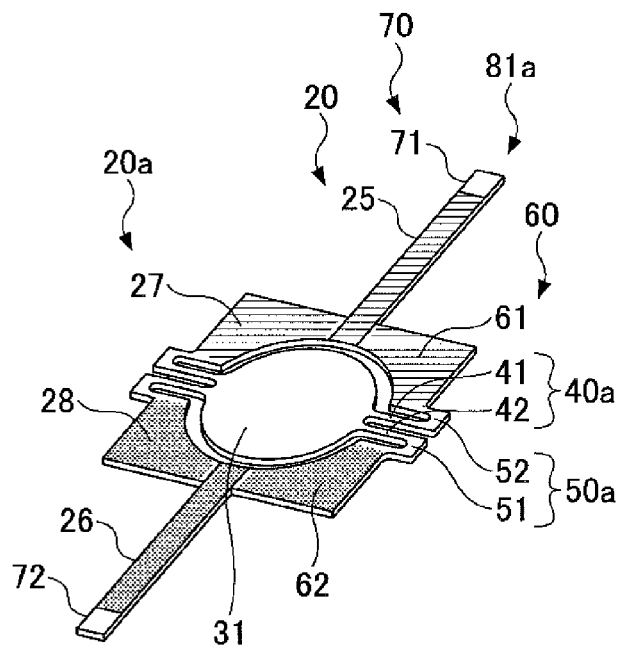
FIG. 21B is a diagram showing the arrangement of electrodes of the actuator of Embodiment 2.
Figures 21C, 22:
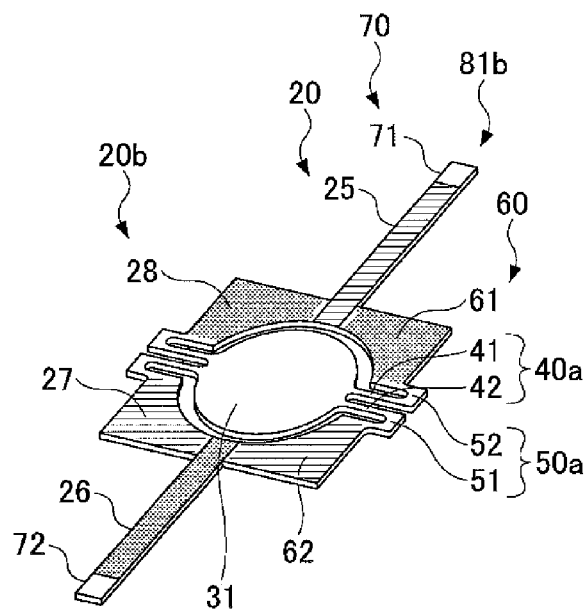
FIG. 21C is a diagram showing the arrangement of electrodes of the actuator of Embodiment 2.
FIG. 22 is a diagram showing the relationship between tilt angle sensitivity and maximum internal stress of the resonant drive part of each of the electrode arrangements of FIG. 21A, FIG. 21B, and FIG. 21C.

FIGS. 21A-21C are diagrams showing an example of the electrode arrangement of the resonant drive part 81 of the actuator of Embodiment 2. FIG. 21A is a perspective view of the resonant drive part 81, as shown in FIGS. 17-20, in which the drive sources 20 are provided only on the drive beams 70. FIG. 21B is a perspective view of a resonant drive part 81a in which drive sources 20a of the same polarity are provided on the drive beam 70 and the movable frame 60. FIG. 21C is a perspective view of a resonant drive part 81b in which drive sources 20a of different polarities are provided on the drive beam 70 and the movable frame 60.

The composition of FIG. 21A is the same as the composition of FIGS. 17-20, the elements in FIG. 21A which the same as corresponding elements in FIGS. 17-20 are designated by the same reference numerals, and a description thereof will be omitted.

The composition of FIG. 21B differs from that of FIG. 21A in that drive sources 27 and 28 are additionally provided on the drive beam 70 and the movable frame 60. The voltage of the first polarity is supplied from the drive sources 25 and 27 to the drive frame 71 and the movable frame 61 connected to the drive beam 71. The voltage of the second polarity opposite to the first polarity is supplied from the drive sources 26 and 28 to the drive frame 72 and the movable frame 62 connected to the drive beam 72. Specifically, the same polarity voltage is supplied to the drive source 25 and the drive source 27 and the same polarity voltage is supplied to the drive source 26 and the drive source 28, but the polarity of the voltage supplied to the drive sources 25 and 27 is opposite to the polarity of the voltage supplied to the drive sources 26 and 28. This method of supplying the voltage is the same as that in the actuator of Embodiment 1 as shown in FIG. 15B.

The composition of FIG. 21C is similar to the composition of FIG. 21B in that the drive sources 27 and 28 are provided on the drive beam 70 and the movable frame 60. However, the composition of FIG. 21C differs from the composition of FIG. 21B in that the polarity of the voltage supplied to the drive source 28 on the movable frame 61 connected to the drive beam 71 is opposite to the polarity of the voltage supplied to the drive source 25 on the drive beam 71, and the polarity of the voltage supplied to the drive source 27 on the movable frame 62 connected to the drive beam 72 is opposite to polarity of the voltage supplied to the drive source 26 on the drive beam 72. This method of supplying the voltage is the same as that in the actuator of Embodiment 1 as shown in FIG. 15C.

FIG. 22 is a diagram showing the relationship between tilt angle sensitivity and maximum internal stress of the resonant drive part of each of the electrode arrangements of FIG. 21A, FIG. 21B and FIG. 21C. In FIG. 22, the highest tilt angle sensitivity is provided by the actuator which has the resonant drive part 81a of the composition of FIG. 21B. The resonant drive part 81 of the composition of FIG. 21A and the resonant drive part 81a of the composition of FIG. 21B equally show the smallest value of the maximum internal stress.

Specifically, in the actuator of Embodiment 2, the electrode arrangement, as shown in FIG. 21B, in which the voltage of the same polarity is supplied to the movable frame 60 connected to the drive beam 70 is the optimal for performing the resonant drive operation. This result differs from that of the actuators of Embodiment 1.

Figure 23A:
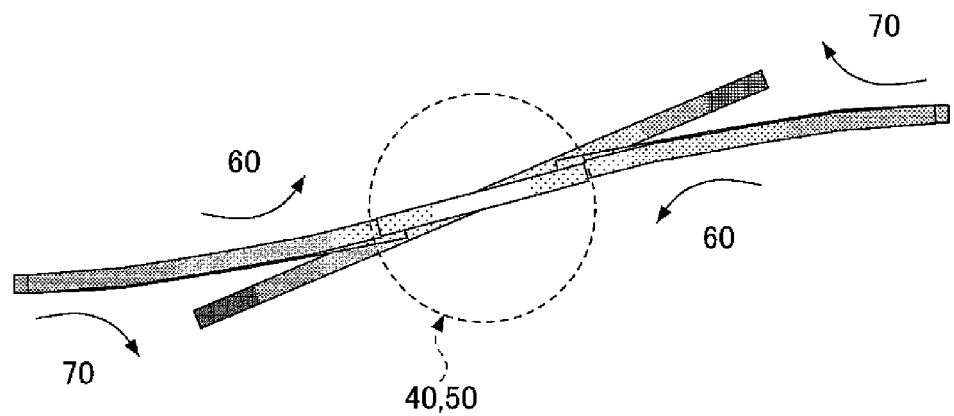
FIG. 23A is a side view showing the resonant drive state of the actuator of Embodiment 1.
Figure 23B:
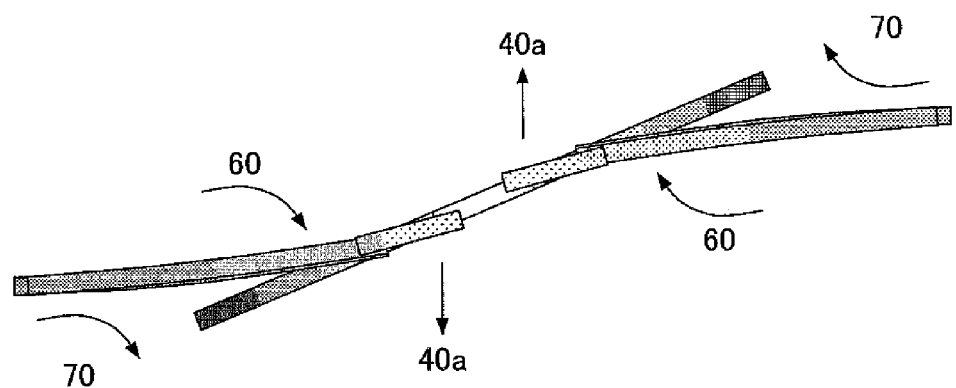
FIG. 23B is a side view showing the resonant drive state of the actuator of Embodiment 2.

FIGS. 23A and 23B are diagrams for explaining the optimal electrode arrangement of the actuator of Embodiment 1 which differs from the optimal electrode arrangement of the actuator of Embodiment 2. FIG. 23A is a side view showing the deformed state at the time of the resonant drive state of the actuator of Embodiment 1, and FIG. 23B is a side view showing the deformed state at the time of the resonant drive state of the actuator of Embodiment 2.

As shown in FIG. 23A, the movable frame 60 is displaced up and down to drive beam 70 and an opposite direction in the actuator of Embodiment 1, main beam 40 and connection part 50 incline, and the amount of the angle of rotation of the mirror 31 is increased. The main beam 40 and the connection part 50 incline, and the tilt angle of the mirror 31 becomes large, so that the camber condition of the movable frame 61 and drive beam 71 and the camber condition of the movable frame 62 and drive beam 72 are large.

On the other hand, as shown in FIG. 23B, the movable frame 60 and drive beam 70 are displaced like one spring and main beam 40 is displaced up and down in the actuator of Embodiment 2, the amount of the angle of rotation of the mirror 31 is increased. The supporting beam 41 and the supporting beam 42 open perpendicularly, a level difference becomes large, and the tilt angle of the mirror 31 is increased, so that the difference of lifting displacement of the movable frame 61 and drive beam 71 and lowering displacement of the movable frame 62 and drive beam 72 is large. It can be understood that the mechanisms to which the same frequency and the same resonance mode also incline completely differ by whether two it is whether the number of supporting beams 40 and 40*a* is one.

In Embodiment 2, the machining to form the rounded corners has not been described, but also in Embodiment 2, the machining to form the rounded corners is applicable. The detailed composition thereof may be the same as that of Embodiment 1.

Embodiment 3

Figure 24A:
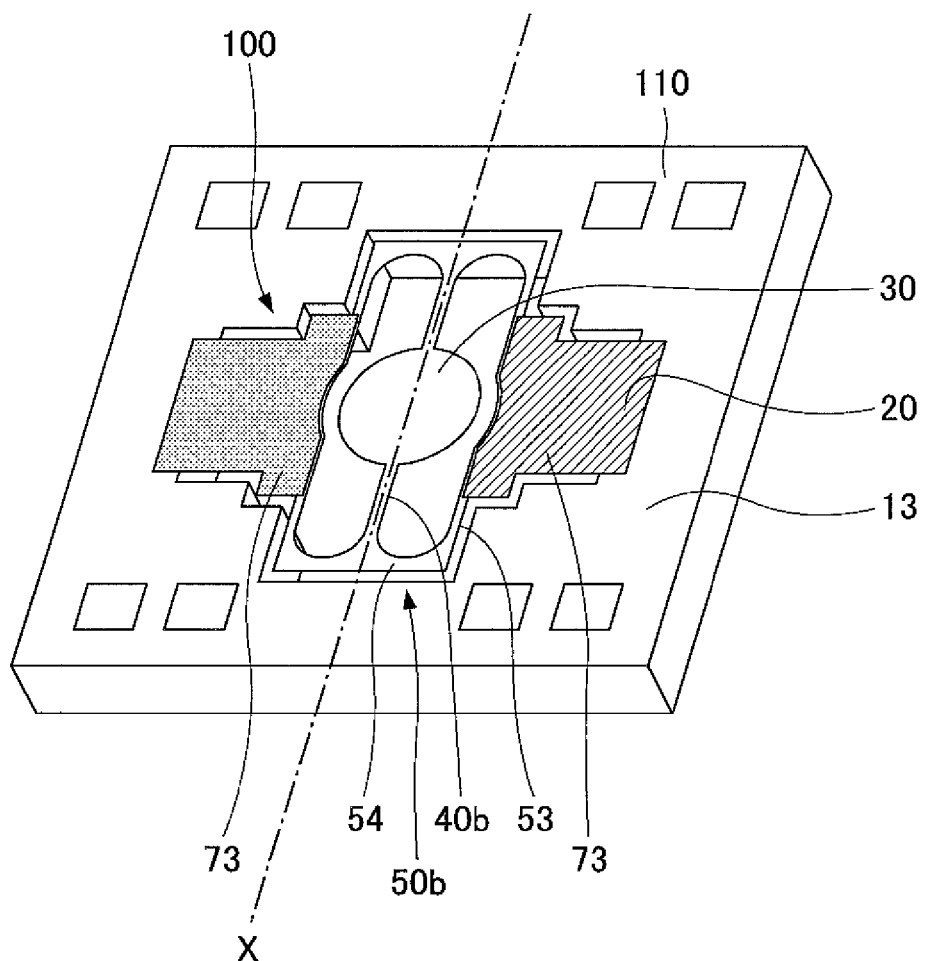
FIG. 24A is a perspective view showing the composition of a front surface of an actuator of Embodiment 3 of the present disclosure.
Figure 24B:
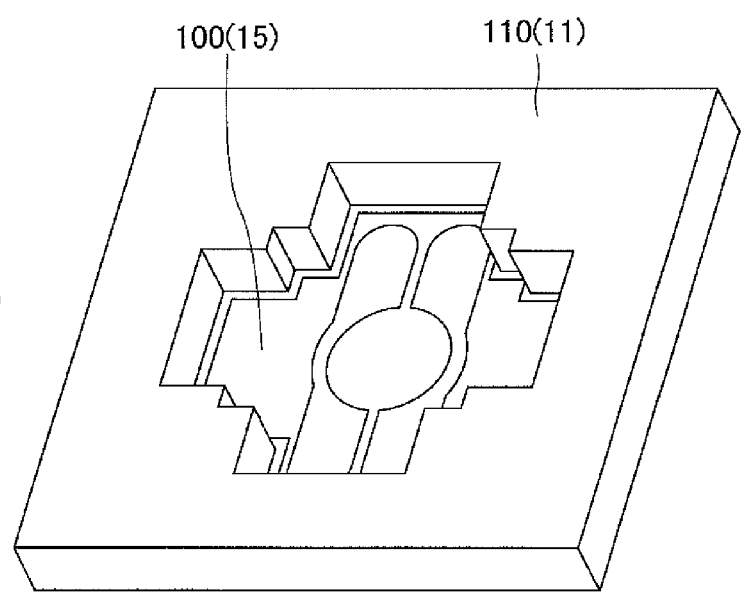
FIG. 24B is a perspective view showing the composition of a back surface of the actuator of Embodiment 3.

FIGS. 24A and 24B are perspective views showing the composition of an actuator of Embodiment 3 of the present disclosure. FIG. 24A is a perspective view of the front surface of the actuator of Embodiment 3, and FIG. 24B is a perspective view of the back surface of the actuator of Embodiment 3.

As illustrated in FIG. 24A, the actuator of Embodiment 3 includes a movable part 100 and a fixed frame 110. The fixed frame 100 is an outer frame which is in a fixed state during the drive operation, and connection support of the movable part 110 is performed at the fixed frame 100. The movable part 100 has object 30, one pair of supporting beams 40*b*, one pair of connection parts 50*b*, and one pair of drive beams 73.

The connection part 50*b* include a drive beam side connection part 53 connected to the drive beam 73, and a supporting beam side connection part 54 which connects the supporting beam 40*b* to the drive beam side connection part 53. Each of the surface sides of the actuator of Embodiment 3 includes the Si activation layer 13.

In the actuator of Embodiment 3, the point that supporting beam 40 which extends along a shaft direction in object 30 is connected is the same as that of the actuator of Embodiment 1.

However, in the actuator of Embodiment 3, it differs from the actuator of Embodiment 1 or Embodiment 2 in that the movable frame 60 is not formed. In the actuator of Embodiment 3, it extends for a long time in the direction perpendicular to the axis of rotation X, and the supporting beam side connection part 54 of the connection part 50*b* is comparable as the width of the object 30.

The drive beam side connection part 53 extends so that it may return from the supporting beam side connection part 54 to the drive beam 73 side vertically in parallel to the axis of rotation X, and it connects with drive beam 73 directly. Therefore, the connection part 50*b* is constituted to include the supporting beam side connection part 54 which connects the drive source side connection part 53 directly connected to the drive beam 73 instead of the movable frame 60, the drive beam side connection part 53, and the supporting beam 40*b*.

In the direction perpendicular to the axis of rotation X, the position where supporting beam side connection part 54 and drive beam side connection part 53 are connected is the same as the end of object 30, or may be constituted outside it. The length of the drive beam side connection part 53 prolonged in the object 30 side in parallel to the axis of rotation X can be secured long enough, and it becomes possible to fully perform absorption abatement of stress. Thus, it is good also as composition which enlarges the length of supporting beam side connection part 54 which extends in the direction perpendicular to the axis of rotation X, connects supporting beam side connection part 54 and drive beam 73 in drive beam side connection part 53, and excludes the movable frame 60.

In this case, the tilting force generated with drive beam 73 is directly transmitted to drive beam side connection part 53 of connection part 50*b*. Since drive beam side connection part 53 has beam structure which reduces stress while being able to transmit the tilting force of drive beam 73 to the supporting beam side connection part 54, it can perform stress distribution appropriately. A smaller space-saving actuator can be constituted by excluding the movable frame 60.

Rather than the drive source 70 of the actuator of Embodiment 1 or Embodiment 2, the drive beam 73 enlarges width parallel to the axis of rotation X, and enlarges the film formation area of piezoelectric device 21 which is the drive source 20. Thereby, while increasing the tilt angle sensitivity further, it becomes possible to drive at still high speed. That is, it can be considered as the actuator having sufficient tilt angle sensitivity. The drive beams 73 are the both sides in the axis of rotation X, and the alternating voltages with different polarities are supplied thereto, which is the same as in the actuator of Embodiment 1 or Embodiment 2.

The mono-axial drive type actuator with which the actuator of Embodiment 3 performs tilting movement around the axis of rotation X is shown. Thus, the actuator of Embodiment 3 can be constituted as a 1 shaft side actuator.

On the other hand, as shown in FIGS. 3 to 6, the actuator which performs a tilting drive is arranged around the axis of rotation different from the axis of rotation X, and it is good for the domain of fixed frame 110 also as a two axes type actuator.

The actuator of Embodiment 3 is applicable also to a mono-axial drive type actuator and a bi-axial drive type actuator.

In FIG. 24B, although the rear-face composition of the actuator of Embodiment 3 is shown, the movable part 100 which showed in FIG. 24A is formed to having a small thickness as the beam 15, and the fixed frame 110 includes the silicon substrate 11 having a small thickness.

Figure 25A:
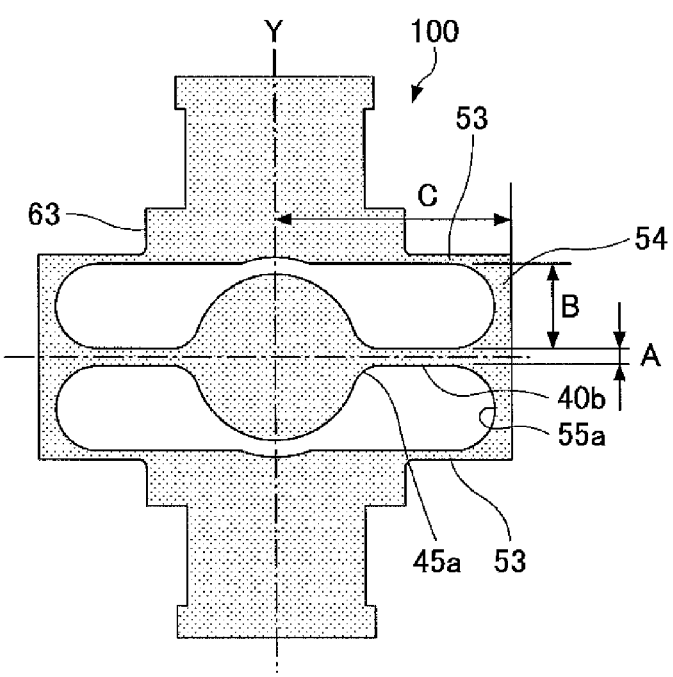
FIG. 25A is a diagram for explaining the parameter setting of the actuator of Embodiment 3.

FIGS. 25A-25C are diagrams for explaining the parameter setting which improves the tilt angle sensitivity of the actuator of Embodiment 3 and reduces the maximum stress thereof. FIG. 25A is a diagram showing the flat-surface composition of the movable part 100 of the actuator of Embodiment 3. In FIG. 25A, the axis of rotation Y which is perpendicular to the axis of rotation X and passes along the center of the object 30 is illustrated.

In FIG. 25A, width of supporting beam 40*b* is set to A, and the width of drive beam side connection part 53 is set to one half A/2 of the width A of the supporting beam 40*b*. The distance from the outer end B, the supporting beam 40*b*, and the drive beam side connection part 53 to the axis of rotation Y is set to C for the length of the supporting beam side connection part 54. The resonance frequency is fixed to 30 kHz by making the variable distance C from the outside end of the supporting beam 40*b* and the drive beam side connection part 53 in the direction of the axis of rotation Y. Although four drive beam side connection parts 53 exist, they are altogether set as a common value. The radius of the rounded corner of the connecting area 45*a* is set to R1=0.15 mm, and the radius of the rounded corner of the connecting area 55*a* is set to R2=B/2. The width A of the supporting beam 40*b* and the length B of supporting beam side connection part 54 are modified as parameters, and the tilt angle sensitivity and the optimum value of the maximum stress are examined.

FIG. 25B is a diagram showing the change characteristic of the tilt angle sensitivity deg/V to the change of the width A of the supporting beam 40*b* in the case of making object 30 tilt by the tilt angle of ±12 deg, and the length B of the supporting beam side connection part 54. In FIG. 25B, in the case of A=0.12 mm, the tilt angle sensitivity is the highest, and the characteristics that the tilt angle sensitivity is the maximum with the value in the vicinity of the value of B=0.5 mm in the range of 0.4 mm<B<0.6 mm is illustrated.

FIG. 25C is a diagram showing the change characteristic of the maximum principal stress to the change of the width A of the supporting beam 40*b* and the length B of the supporting beam side connection part 54. If the maximum stress is below 0.5 GPa, it is a numerical value which is satisfactory as resistance of an actuator. In the case of A>0.1 mm, in FIG. 25C, the maximum stress is below 0.5 GPa. In the case of A=0.14 mm or A=0.12 mm, the characteristics that the maximum stress serves as the minimum 0.4 mm<B<0.6 mm near B=0.5 mm are shown. Therefore, the tilt angle sensitivity is high and it is good for the maximum stress to adopt the form of A=0.12 mm, B=0.5 mm, and C=1.4 mm, R1=0.15 mm, R2=0.25 mm as being comparatively small size and small shape. In this case, the voltage for making the tilt angle sensitivity tilt by the tilt angle of 4.50 deg/V and ±12 deg. can be set to 0-5.3 V, the maximum stress can be set to 0.38 GPa, and it can be considered as the good characteristics that the maximum stress is small and the tilt angle sensitivity is high.

Embodiment 4

Figure 26A:
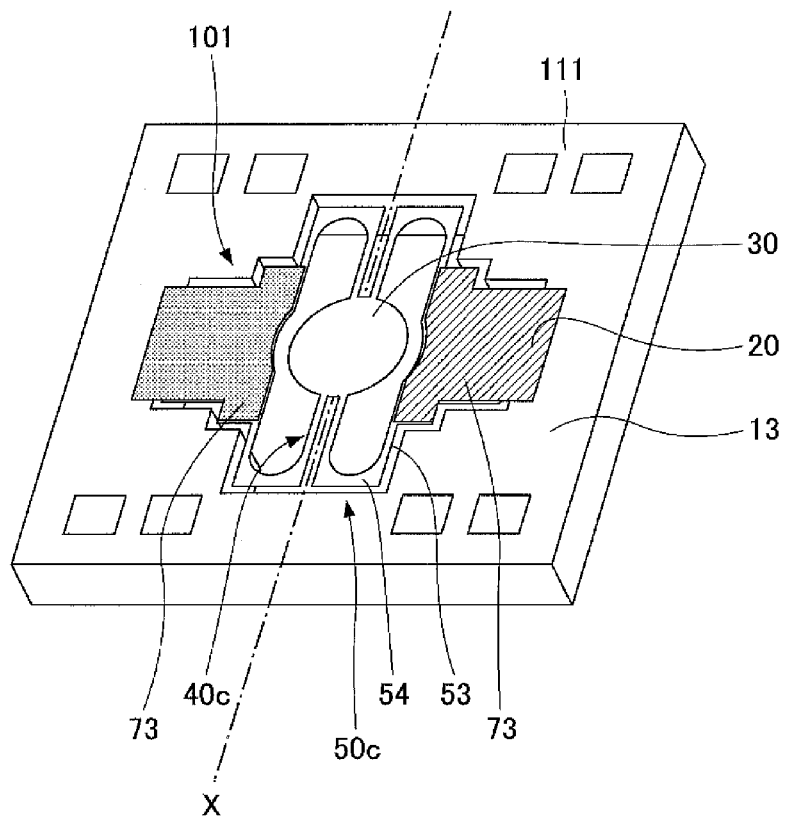
FIG. 26A is a perspective view showing the composition of a front surface of an actuator of Embodiment 4 of the present disclosure.
Figure 26B:
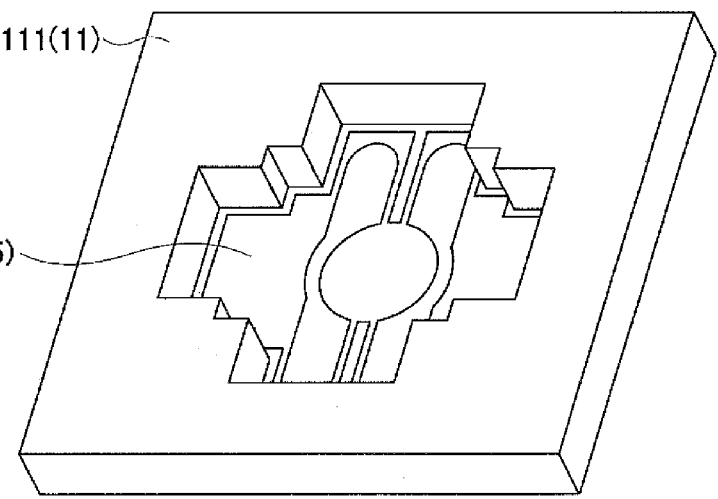
FIG. 26B is a perspective view showing the composition of a back surface of the actuator of Embodiment 4.

FIG. 26A and FIG. 26B are perspective views showing the composition of an actuator of Embodiment 4 of the present disclosure. FIG. 26A is a diagram showing the composition of a front surface of the actuator of Embodiment 4, and FIG. 26B is a diagram showing the composition of a back surface of the actuator of Embodiment 4.

As illustrated in FIG. 26A, the actuator of Embodiment 4 includes a movable part 101 and a fixed frame 111. The fixed frame 111 of the point that are an outer frame in a fixed state and connection support of the movable part 111 is performed also during the drive operation at the fixed frame 111 is the same as that of the actuator of Embodiment 3.

The movable part 101 includes an object 30, a pair of supporting beams 40c, a pair of connection parts 50c, and connection part 50c of it is the same as that of the actuator which the point containing drive beam side connection part 53 and supporting beam side connection part 54 also requires for Embodiment 3.

The supporting beam 40c has separated along the direction parallel to the axis of rotation X, and the actuator of Embodiment 4 differs from the actuator of Embodiment 3 at the point which has become two. The composition of this supporting beam 40c is supporting beam 40a of the actuator of Embodiment 2, and similar composition.

In this regard, it dissociates in the direction parallel to the axis of rotation X, and connection part 50c also contains two connection parts 50c. Each is vertically prolonged in the direction of the axis of rotation X, and two connection parts 50c serve as the form where each formed U character with supporting beam 40c.

With the above composition, the supporting beam 40c and the connection parts 50c are the both sides in the axis of rotation X, and become possible performing independent movement. Therefore, the actuator of Embodiment 4 has composition which can obtain a large tilt angle by enlarging the difference of elevation of the two supporting beams 40c, and driving it like the actuator of Embodiment 2. The length of the supporting beam side connection part 54 which extends in the direction perpendicular to the axis of rotation X of the connection part 50c is comparable as the width of object 30, or is more than it, and the point which does not need the movable frame 60 is the same as that of the actuator of Embodiment 3. Thus, the movable frame 60 is not needed but a small space-saving actuator can be provided.

Since the drive beam side connection part 53 and supporting beam side connection part 54 have beam structure with elastic force like the actuator of Embodiment 3, connection part 50c can absorb and reduce the added stress, can be stabilized, and can carry out tilting movement of the object 30. The features that the area of the drive beam 73 on which the drive source 20 is formed can be increased and sufficient tilt angle sensitivity and high speed drive can be realized are the same as that of the actuator of Embodiment 3.

In FIG. 26B, the perspective view of the back surface of the actuator of Embodiment 4 is given. The outer fixed frame 111 includes a thick silicon substrate 11, and the point of the movable part 101 which includes a thin elastic body as the beam 15 is the same as that of the actuator of Embodiment 3.

Figure 27A:
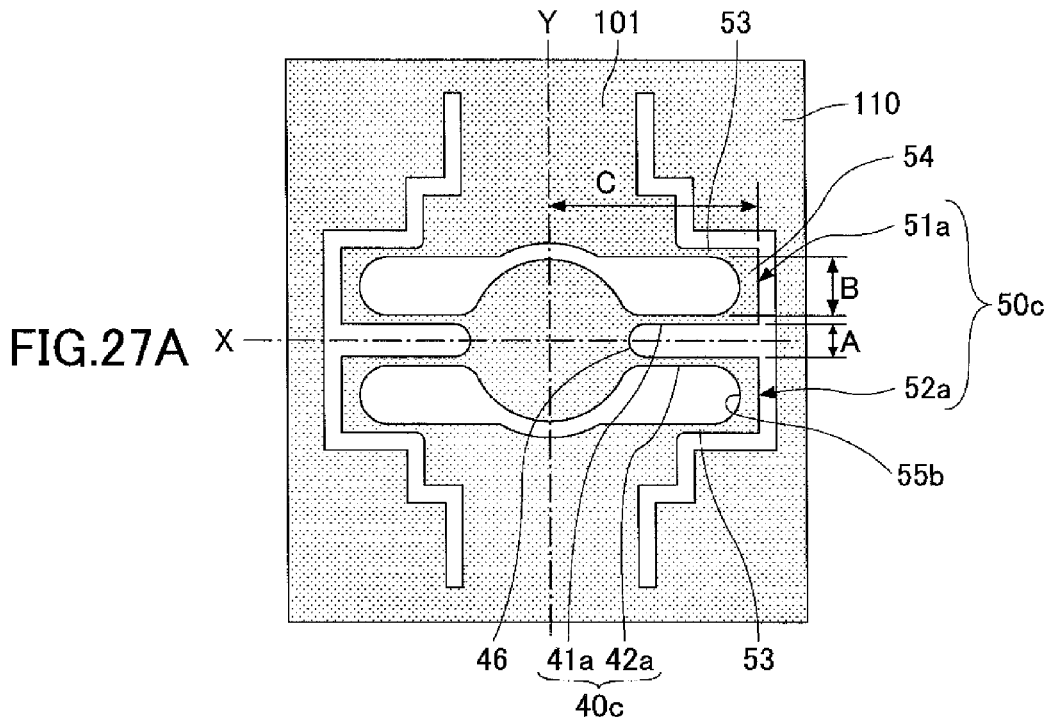
FIG. 27A is a diagram for explaining an optimal design method for the actuator of Embodiment 4.
Figure 27B:
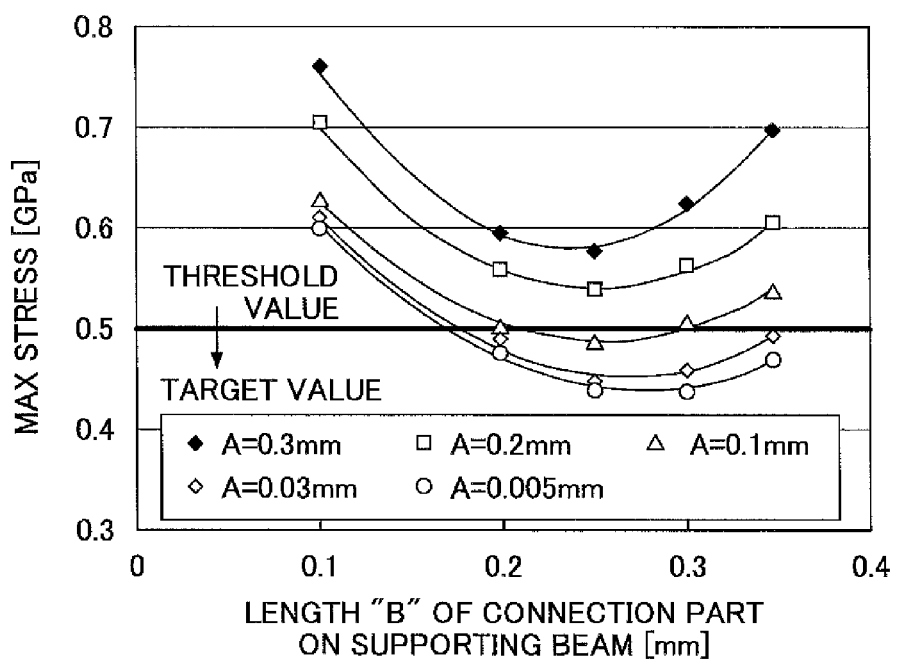
FIG. 27B is a diagram for explaining the optimal design method for the actuator of Embodiment 4.
Figure 27C:
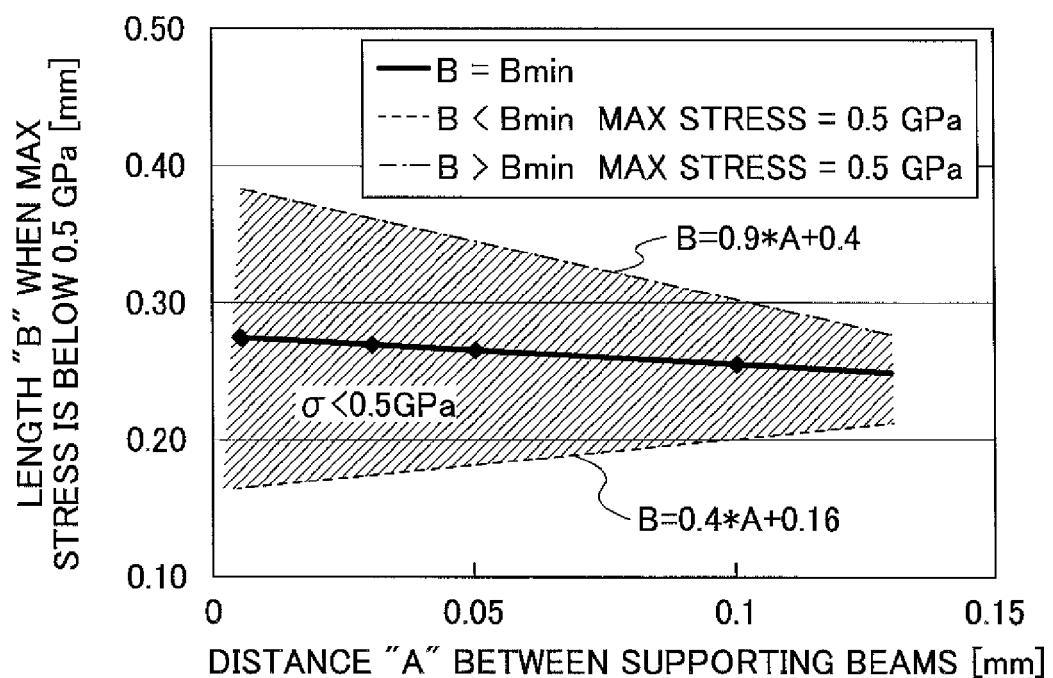
FIG. 27C is a diagram for explaining the optimal design method for the actuator of Embodiment 4.

FIGS. 27A-27C are diagrams for explaining the optimal design method for the movable part 101 of the actuator of Embodiment 4. FIG. 27A is a diagram showing the composition of the actuator of Embodiment 4. As shown in FIG. 27A, the supporting beam 40c in the actuator of Embodiment 4 includes two supporting beams 41a and 42a separated along the direction parallel to the axis of rotation X. In connection with this, the connection part 50c is also divided into two connection parts 51a and 52a which are separated from each other symmetrically with respect to the axis of rotation X. The connection part 51a is connected to the supporting beam 41a, and the connection part 52a is connected to the supporting beam 42a. The supporting beam side connection part 54 of each of the connection parts 51a and 52a transversely extends in the direction perpendicular to the axis of rotation X apart from the axis of rotation X and the drive source side connection part 53 extends in the direction parallel to the axis of rotation X.

In FIG. 27A, each parameter is defined as follows. Each width of the beams 41a and 42a of the supporting beam 40c is 0.06 mm, and similarly the width of the drive beam side connection part 53 of the connection part 50c is 0.06 mm. The resonance frequency can be greatly adjusted by changing the width of the supporting beam 40c which elastically supports the object 30 and the width of the drive beam side connection part 53. It is supposed that, in this embodiment, the widths of the supporting beam 40c and the drive beam side connection part 53 are set to be constant, and other parameters are varied.

The distance between the two supporting beams 41a and 42a is set to A, and the length of supporting beam side connection part 54 is set to B. The distance from the outer end of the drive beam side connection part 53 to the axis of rotation Y, which includes the portion of the drive beam 73, is set to C.

In this case, the resonance frequency can be adjusted to a fixed level of 30 kHz by making the parameter C variable. That is, fine adjustment of the resonance frequency is attained.

The radius R of the connection part 46 between the object 30 and the supporting beam 40c is set as R1=A/2, and the R radius of the connecting area 55b between the supporting beam 40c and the connecting area 55b is set as R2=B/2.

FIG. 27B is a diagram showing the change characteristic of the maximum stress when the ±12 deg tilting drive operation of the object 30 is performed under the conditions of FIG. 27A, with the distance A between the two supporting beams 41a and 42a, and the distance B between the supporting beam 40c and the drive beam side connection part 53 (the length of the supporting beam side connection part 54) being made the variables. In FIG. 27B, the horizontal axis denotes the length B of the supporting beam side connection part 54 in mm, and the vertical axis denotes the maximum stress in GPa.

In FIG. 27B, it is shown that the maximum stress is small when the value of A is small. If the distance B between the supporting beam 40c and the drive beam side connection part 53 when the stress is the minimum is set to Bmin, the value of Bmin satisfies the condition of the following formula (1).

$$B\text{min} = -0.2 \times A + 0.28 \quad (1)$$

The above formula (1) is a relational expression obtained by connecting the local minimum of each characteristic curve.

Figure 28A:
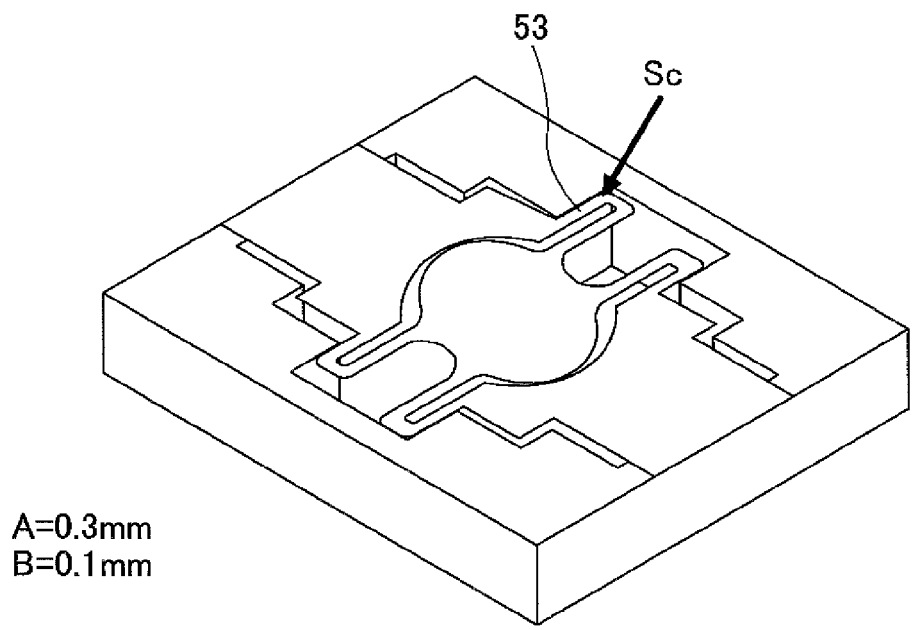
FIG. 28A is a diagram for explaining the length B of a supporting beam side connection part which has the local minimum.
Figure 28B:
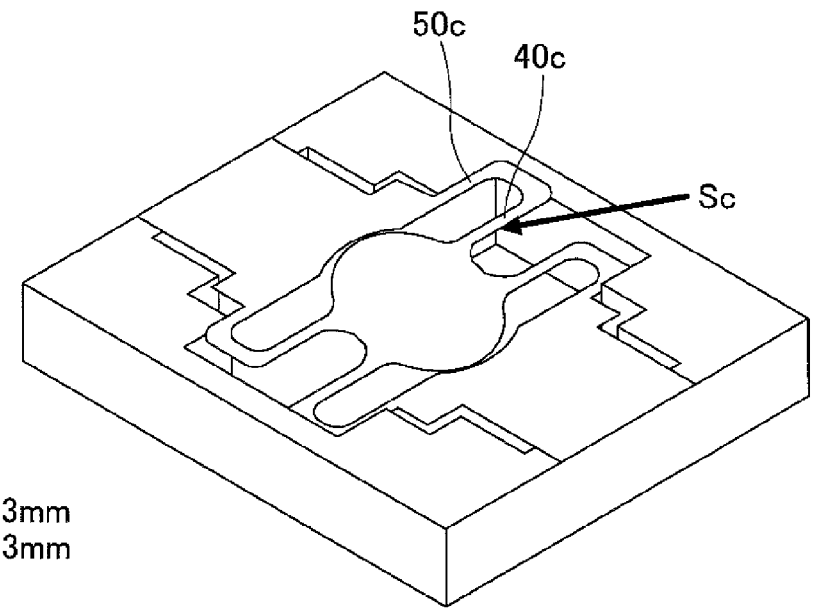
FIG. 28B is a diagram for explaining the length B of the supporting beam side connection part which has the local minimum.
Figure 28C:
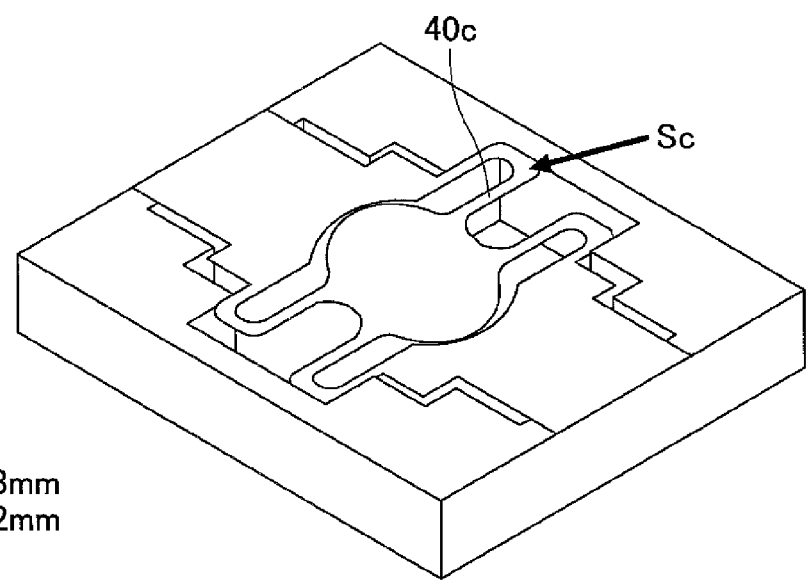
FIG. 28C is a diagram for explaining the length B of the supporting beam side connection part which has the local minimum.

FIGS. 28A-28C are diagrams for explaining the length B of the supporting beam side connection part 54 which has the local minimum. According to the formula (1), the local minimum in the curve at A=0.3 mm is represented by Bmin=(−0.2)×0.3+0.28=0.22≈0.2. In FIGS. 28A-28C, the stress-distribution diagrams in which the value of B is varied in the case of A=0.3 mm are shown. FIG. 28A is a diagram showing the stress distribution of the actuator at B=0.1 mm. The stress distribution in the case of B<Bmin=0.2 mm is shown in FIG. 28A. In this case, the stress is concentrated on the drive beam side connection part 53 as indicated by the arrow Sc in FIG. 28A.

FIG. 28B is a diagram showing the stress distribution of the actuator at B=0.3 mm. The stress distribution in the case of B>Bmin=0.2 mm is shown in FIG. 28B. In this case, the stress is concentrated on the supporting beam 40c as indicated by the arrow Sc in FIG. 28B.

FIG. 28C is a diagram showing the stress distribution of the actuator at B=0.2 mm. The stress distribution in the case of B=Bmin=0.2 mm is shown in FIG. 28C. In this case, the stress is concentrated on the position of the connection part 50c in the vicinity of an intermediate position between the supporting beam 40c and the drive beam side connection part 53 as indicated by the arrow Sc in FIG. 28C.

In the composition of FIG. 27A, the width of each of the supporting beam 40c and the drive beam side connection part 53 is 0.06 mm, which is smaller than the width of the supporting beam side connection part 50c which connects these parts, and contains the torsion part. Therefore, if the length of the supporting beam side connection part 54 is too small, the stress will be concentrated on the torsion part of the drive beam side connection part 53, and if the length of the supporting beam side connection part 54 is too large, the stress will be concentrated on the torsion part of the supporting beam 40c. By making the length of the supporting beam side connection part 54 into a medium length, stress raisers can be shifted to the supporting beam side connection part 54. By shifting the stress raisers to the supporting beam connection part 54 which is wide and does not contain a large torsion part, the stress when the ±12 deg tilting drive operation of the object 30 is performed can be reduced and the local minimum can be given.

In the change characteristics of FIG. 27B, there is a partial range of the curves (A=0.1 mm, A=0.03 mm, and A=0.005 mm) in which the stress is below the threshold value of 5 GPa. That is, the requirement is met only in the partial ranges of the characteristic curves shown in FIG. 27B where A<0.2 mm and the value of B is within the prescribed range. On the other hand, the maximum stress is above 0.5 GPa in the ranges of the characteristic curves where A 0.2 mm, regardless of the value of B.

In the A<0.2 mm characteristic curve, the relational expression of the smaller value of B where the stress is equal to the threshold value of 0.5 GPa is represented by the following formula (2).

$$B=0.4\times A+0.16 \quad (2)$$

The relational expression of the larger value of B where the stress is equal to the threshold value of 0.5 GPa is represented by the following formula (3).

$$B=-0.9\times A+0.4 \quad (3)$$

Therefore, in addition to the value of Brain that satisfies the above formula (1), the distance B where the stress is below the threshold value of 0.5 GPa satisfies the conditions of the following formula (4).

$$0.4\times A+0.16<=B<=-0.9\times A+0.4 \quad (4)$$

FIG. 27C is a diagram showing the ranges in which the relational expressions of the above formulas (1)-(4) are met. In FIG. 27C, the horizontal axis denotes the distance A between the supporting beams 41a and 42a in mm, and the vertical axis denotes the length B of the supporting beam side connection part 54 in mm.

In FIG. 27C, the range which satisfies the formula (4) is indicated by the shaded lines, and the condition of the formula (1) is included between the borderlines represented by the formula (2) and the formula (3). From a viewpoint of the stress, the combination of the values of A and B which satisfy the condition of the formula (1) is the optimal. However, if the values of A and B fall within the range of the formula (4), it can be said that there is no design problem. Therefore, it can be understood that it is sufficient to obtain the design in which the distance A between the supporting beams 41a and 42a and the length B of the supporting beam side connection part 54 are defined by the values which fall within the range of the formula (4) indicated by the shaded lines in FIG. 27C.

Figure 29:
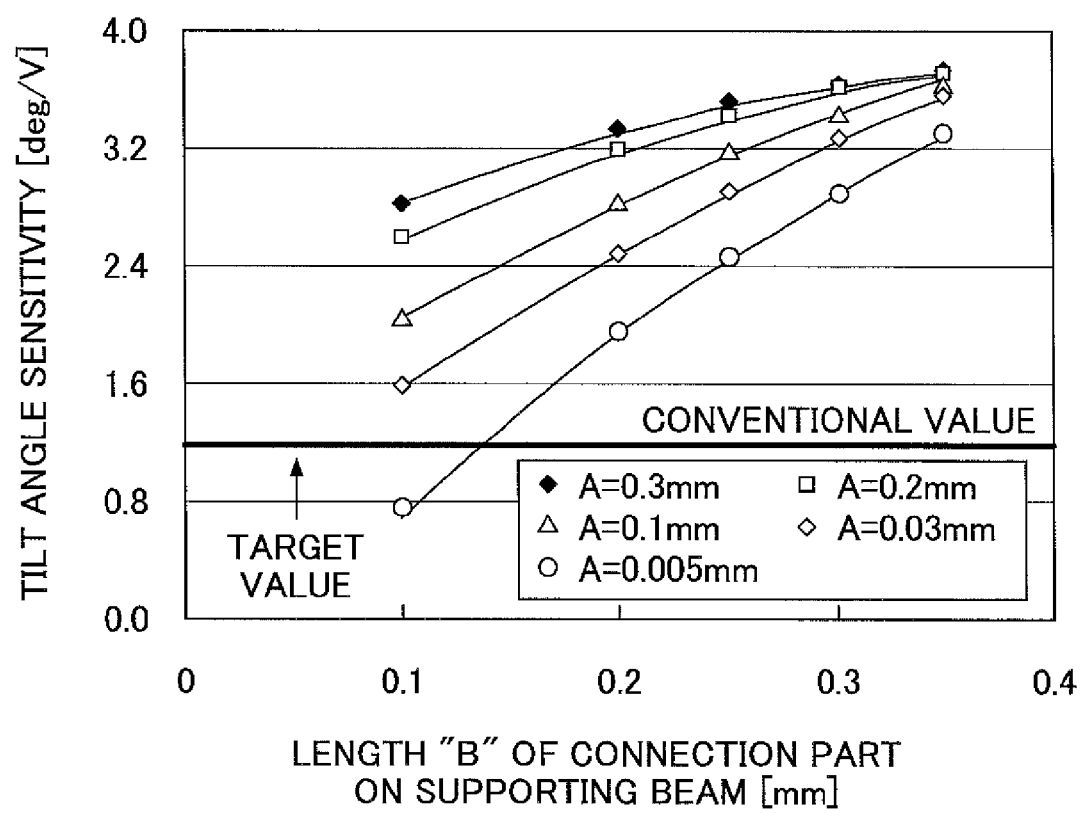
FIG. 29 is a diagram for explaining the characteristics of tilt angle sensitivity of the actuator of Embodiment 4.

FIG. 29 is a diagram showing the characteristics of the tilt angle sensitivity when the distance A between the supporting beams 41a and 42a and the length B of the supporting beam side connection part 54 are set to the parameters. In FIG. 29, the horizontal axis denotes the length B of the supporting beam side connection part 54 in mm, and the vertical axis denotes the tilt angle sensitivity in deg/V.

In FIG. 29, it is shown that the tilt angle sensitivity becomes large when both the values of A and B are large. Therefore, the values of A and B where the maximum stress is below 0.5 GPa and the tilt angle sensitivity is the maximum as illustrated in FIG. 27C are the optimal parameter setting.

In view of the illustrated range, the optimal values are A=0.03 mm and B=0.35 mm. At this time, each width of the supporting beams 41a and 42a and the drive beam side connection part 54 is set to 0.06 mm, C=1.2 mm, R1=0.015 mm, R2=0.175 mm. The characteristics in this case are such that the tilt angle sensitivity is 3.58 deg/V, the voltage needed to obtain the tilt angles of ±12 deg. is set to 0-6.5 V, and the maximum stress is 0.49 GPa.

The tilt angle sensitivity in the actuator of Embodiment 4 is lower than that in the actuator of Embodiment 3, and the maximum stress in the actuator of Embodiment 4 is larger than that in the actuator of Embodiment 3. The actuator of Embodiment 4 can be formed smaller in size than the actuator of Embodiment 3. Therefore, when it is desired to use an actuator with higher tilt angle sensitivity, the actuator of Embodiment 3 may be selected, and when it is desired to use a smaller actuator, the actuator of Embodiment 4 may be selected. In this manner, one of the actuator of Embodiment 3 and the actuator of Embodiment 4 can be properly selected depending on the usage. The object to be driven by the actuator of Embodiment 3 or Embodiment 4 may be the mirror 31 as previously explained in Embodiment 1 or Embodiment 2.

In Embodiment 3 or Embodiment 4, the example of the mono-axial drive actuator has been described. However, as previously described with FIGS. 3-6, a bi-axial drive actuator may be constituted by the actuator of Embodiment 3 or 4.

Embodiment 5

Figure 30:
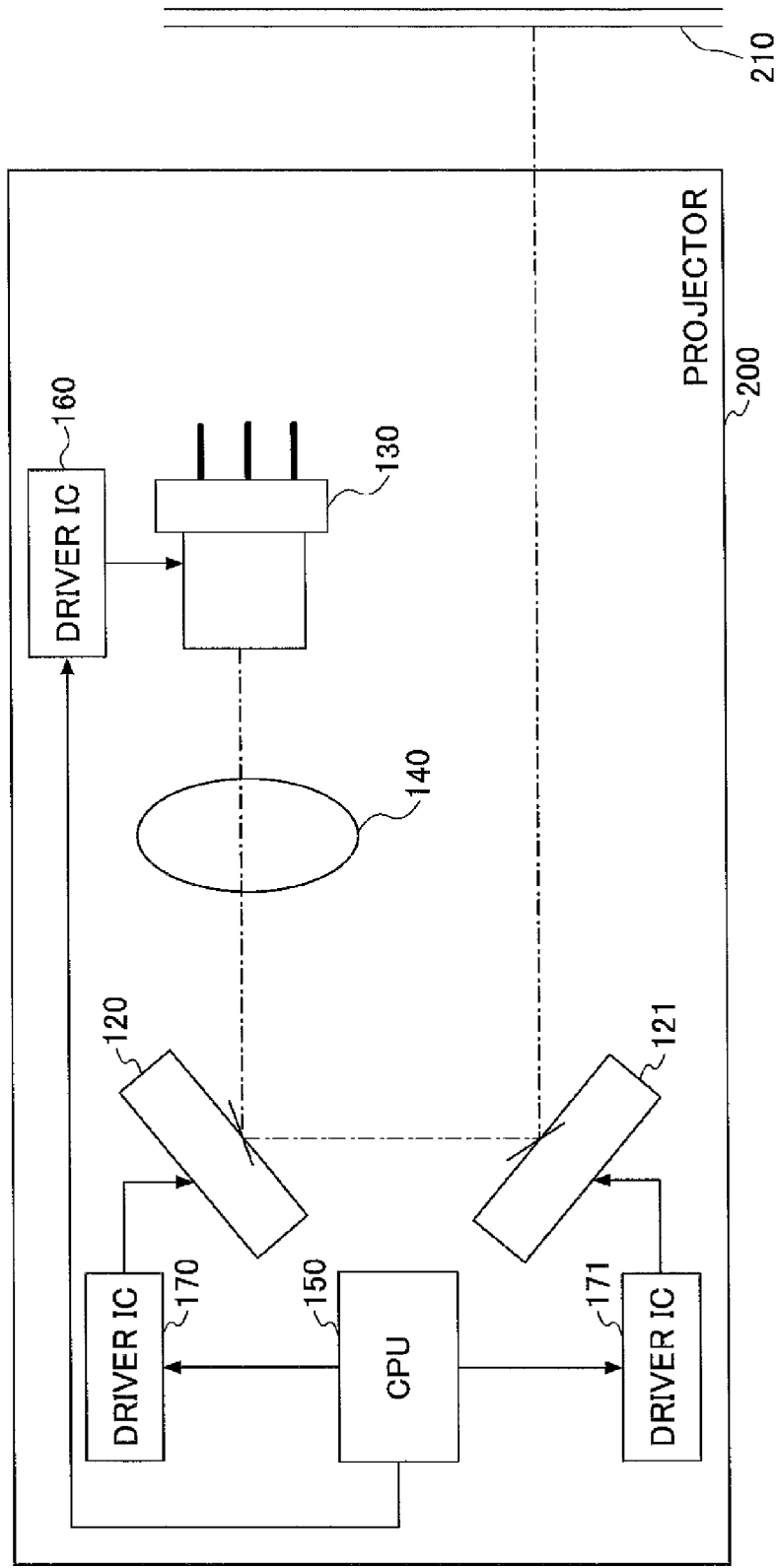
FIG. 30 is a diagram showing the composition of a projector of Embodiment 5 of the present disclosure.

FIG. 30 is a diagram showing the composition of a projector 200 of Embodiment 5 of the present disclosure. In Embodiment 5, an example in which the actuator of any of Embodiments 1-4 is applied to an optical scanning device 200, namely the projector 200, will be described.

As illustrated in FIG. 30, the projector 200 of Embodiment 5 includes a first piezoelectric mirror 120, a second piezoelectric mirror 121, a laser diode 130, a collimating lens 140, a CPU (central processing unit) 150, a laser diode driver IC (integrated circuit) 160, a first piezoelectric mirror driver IC 170, and a second piezoelectric mirror driver IC 171. In FIG. 30, a screen 210 is illustrated as a related component.

The projector 200 is an optical scanning device which projects an image on the screen 210. The first piezoelectric mirror 120 is constituted as a mono-axial drive actuator which tilts and drives the mirror 31 around the axis of rotation X and applied to the projector 200. Similarly, the second piezoelectric mirror 120 is constituted as a mono-axial drive actuator which tilts and drives the mirror 31 around the axis of rotation Y and applied to the projector 200.

The laser diode 130 is a light source which emits a laser beam. The laser beam emitted from the laser diode 130 may be a diverging light beam. The collimating lens 140 is a unit to convert the diverging light beam into a parallel light beam. The parallel light beam may include a P polarized light beam in which the light beam vibrates in the directions within the plane of incidence of the light beam, and an S polarized light beam in which the light beam vibrates in the directions at right angles to the plane of incidence of the light beam.

The parallel light beam from the collimating lens 220 is irradiated to the first piezoelectric mirror 120, and reflected by the mirror 31. The first piezoelectric mirror 120 performs the tilting drive of the mirror 31 around the axis of rotation X and provides the motion in which the reflected laser beam vibrates at right angles to the axis of rotation X. The first piezoelectric mirror 120 may be constituted by any of the actuators of Embodiments 1-4. The reflected light beam from the first piezoelectric mirror 120 is irradiated to the second piezoelectric mirror 121.

The second piezoelectric mirror 121 performs the tilting drive of the mirror 31 around the axis of rotation Y and reflects the laser beam sent from the first piezoelectric mirror 120. Thereby, the motion in which the reflected light beam vibrates at right angles to the axis of rotation Y is provided. The second piezoelectric mirror 121 is constituted by any of the actuators of Embodiments 1-4, similar to the first piezoelectric mirror 120. The laser beam reflected by the second piezoelectric mirror 121 is irradiated to the screen 210. By the combination of the first piezoelectric mirror 120 and the second piezoelectric mirror 121, the laser beam on the screen 210 can be scanned in the mutually orthogonal directions to form an image.

The CPU 150 is a unit to control the laser diode driver IC 160, the first piezoelectric mirror driver IC 170, and the second piezoelectric mirror driver IC 171. The laser diode driver IC 160 is a unit to drive the laser diode 130. The first piezoelectric mirror driver IC 170 is a unit to drive the first piezoelectric mirror 120, and the second piezoelectric mirror driver IC 171 is a unit to drive the second piezoelectric mirror 121.

The CPU 150 controls the laser driver IC 160 to drive the laser diode 130. The CPU 150 controls the second piezoelectric mirror driver 171, and controls tilting operation around the axis of rotation Y of the second piezoelectric mirror 121 while it controls the first piezoelectric mirror driver 170 and controls tilting operation around the axis of rotation X of the first piezoelectric mirror 120. When the first piezoelectric mirror 120 and the second piezoelectric mirror 121 carry out the tilting drive operation, the bi-axial motion around the axis of rotation X and the axis of rotation Y is provided to the laser beam, and the light beam reflected by the mirror 31 of the second piezoelectric mirror 121 is scanned over the screen 210 so that an image is formed on the screen 210.

Thus, the actuator of this embodiment can be suitably applied to the piezoelectric mirrors 120 and 121 in the projector 200. The stress loads can be reduced, and the mirror 31 can be driven in a stable state to project an image on the screen.

In Embodiment 5, the example in which the first piezoelectric mirror 120 performs the tilting drive operation around the axis of rotation X and the second piezoelectric mirror 121 performs the tilting drive operation around the axis of rotation Y has been illustrated. Alternatively, the present embodiment may be modified such that the sequence of the operations is reversed. Alternatively, the first axis of rotation around which the tilting drive operation is performed by the first piezoelectric mirror 120, and the second axis of rotation around which the tilting drive operation is performed by the second piezoelectric mirror 121 may be optional depending on the usage if the axes of rotation differ from each other.

The present disclosure is not limited to the above-described embodiments, and variations and modifications may be made without departing from the scope of the present disclosure.

The present international application is based on and claims the benefit of priority of Japanese patent application No. 2009-114317, filed on May 11, 2009, and Japanese patent application No. 2009-205316, filed on Sep. 4, 2009, the contents of which are incorporated herein by reference in their entirety.

The invention claimed is:

1. An actuator which tilts and drives an object to be driven around an axis of rotation, comprising:
   a pair of supporting beams arranged to support the object to be driven from both sides thereof in a direction parallel to the axis of rotation;
   a pair of movable frames arranged to sandwich the object to be driven and the pair of supporting beams from both sides in a direction perpendicular to the axis of rotation;
   a drive source arranged to apply bending vibration to the movable frames; and
   a pair of connection parts arranged to connect the movable frames and end portions of the supporting beams by a beam structure, convert the bending vibration into torsional vibration, and transmit the torsional vibration to the supporting beams,
   wherein the end portion of each supporting beam extends outward from a width of each movable frame along the axis of rotation, and each connection part has the beam structure that includes a beam transversely extending from the end portion of the supporting beam on both sides of the end portion in a direction intersecting the axis of rotation and connected to the movable frames.

2. The actuator according to claim 1, further comprising a pair of drive beams connected to the pair of movable frames to sandwich the pair of movable frames from both sides thereof in the direction perpendicular to the axis of rotation, each of the drive beams including the drive source provided on the drive beam.

3. The actuator according to claim 2, wherein the drive sources provided on the drive beams are piezoelectric devices that expand or contract by supplying alternating voltage thereto, and a polarity of the alternating voltage supplied to one of the piezoelectric devices and a polarity of the alternating voltage supplied to the other piezoelectric device are opposite to each other.

4. The actuator according to claim 3, wherein each of the movable frames includes a piezoelectric device provided on the movable frame, and a polarity of the alternating voltage supplied to one of the piezoelectric devices on the drive beam and the movable frame which are provided on the same side and connected together, and a polarity of the alternating voltage supplied to the other piezoelectric device are opposite to each other.

5. The actuator according to claim 2, wherein each of the supporting beams comprises two supporting beam portions extending in parallel with each other along the axis of rotation, and each of the connection parts is arranged to connect one of the two supporting beam portions of the supporting beam to one of the movable frames which is nearer to the connection part.

6. The actuator according to claim 5, wherein each of the movable frames includes a piezoelectric device provided on the movable frame, and a polarity of the alternating voltage supplied to one of the piezoelectric devices on the drive beam and the movable frame, which are provided on the same side and connected together, is the same as a polarity of the alternating voltage supplied to the other piezoelectric device.

7. The actuator according to claim 2, wherein a rounded corner is formed in each of a connecting area between the object to be driven and one of the supporting beams, a connecting area between one of the supporting beams and one of the connection parts, and a connecting area between one of the connection parts and one of the movable frames.

8. The actuator according to claim 2, wherein rounded corners are formed in connecting areas between the movable frames and the drive beams.

9. The actuator according to claim 2, wherein the drive sources generate vibration when a resonant drive operation is performed.

10. The actuator according to claim 9, wherein the object to be driven and the movable frames are inclined in a same direction in a resonant drive state when the resonant drive operation is performed.

11. The actuator according to claim 1, wherein the object to be driven is a mirror.

12. An optical scanning device comprising:

the actuator according to claim 1; and a light source that emits a light beam to the actuator, wherein a tilting drive operation is performed to tilt and drive a mirror of the actuator so that the light beam from the light source is reflected by the mirror of the actuator and the reflected light beam is scanned.

13. An optical scanning device which includes a plurality of the actuators according to claim 1 and projects an image on a screen, the optical scanning device comprising:

a light source which emits a light beam;

a first actuator which includes a first mirror that reflects the light beam from the light source and is arranged to tilt and drive the first mirror around a first axis of rotation; and a second actuator which includes a second mirror that reflects the light beam from the first actuator and is arranged to tilt and drive the second mirror around a second axis of rotation, wherein the light beam from the second actuator is scanned over the screen to form an image thereon.

* * * * *